United States Patent
Tsukamoto et al.

(10) Patent No.: US 8,448,047 B2
(45) Date of Patent: May 21, 2013

(54) STORAGE DEVICE, STORAGE CONTROL DEVICE, DATA TRANSFER INTERGRATED CIRCUIT, AND STORAGE CONTROL METHOD

(75) Inventors: Nina Tsukamoto, Kawasaki (JP); Sadayuki Ohyama, Kawasaki (JP); Yuji Hanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 256 days.

(21) Appl. No.: 12/923,005

(22) Filed: Aug. 27, 2010

(65) Prior Publication Data

US 2010/0325522 A1  Dec. 23, 2010

Related U.S. Application Data

(63) Continuation of application No. PCT/JP2008/053494, filed on Feb. 28, 2008.

(51) Int. Cl.
*G11C 29/00*  (2006.01)

(52) U.S. Cl.
USPC .......................................................... 714/770

(58) Field of Classification Search
USPC ..................... 714/763, 769–770; 711/114
See application file for complete search history.

(56) References Cited

U.S. PATENT DOCUMENTS

| | | | |
|---|---|---|---|
| 5,619,690 A | 4/1997 | Matsumani et al. | |
| 7,096,316 B1 * | 8/2006 | Karr et al. | 711/114 |
| 7,979,633 B2 * | 7/2011 | Kleiman et al. | 711/114 |
| 2002/0156983 A1 | 10/2002 | Jones et al. | |
| 2006/0161756 A1 | 7/2006 | Yagisawa et al. | |
| 2006/0179219 A1 | 8/2006 | Daikokuya et al. | |
| 2007/0168605 A1 | 7/2007 | Takai et al. | |

FOREIGN PATENT DOCUMENTS

| | | |
|---|---|---|
| JP | 7-160594 | 6/1995 |
| JP | 2001-273176 | 10/2001 |
| JP | 2004-506256 | 2/2004 |
| JP | 2004-531814 | 10/2004 |
| JP | 2006-195851 | 7/2006 |
| JP | 2006-221371 | 8/2006 |
| JP | 2007-193449 | 8/2007 |
| WO | WO 02/01365 A2 | 1/2002 |

OTHER PUBLICATIONS

International Search Report for PCT/JP2008/053494, mailed Jul. 22, 2008.

* cited by examiner

*Primary Examiner* — Shelly A Chase

(74) *Attorney, Agent, or Firm* — Staas & Halsey LLP

(57) ABSTRACT

A storage device is for restoring the data saved in a nonvolatile memory to a cache memory, even if there is not a read response from the nonvolatile memory. In a data saving operation, parity data of to-be-saved data is generated, and the to-be-saved data and the parity data having CRCs and AIDs added thereto are written into a flash memory. In a data restoring operation, if an operation to read data from the flash memory is not completed within a predetermined period of time, the data reading operation is suspended, and additional data is set. The to-be-saved data having a data error corrected with the parity data is then written into the cache memory.

21 Claims, 18 Drawing Sheets

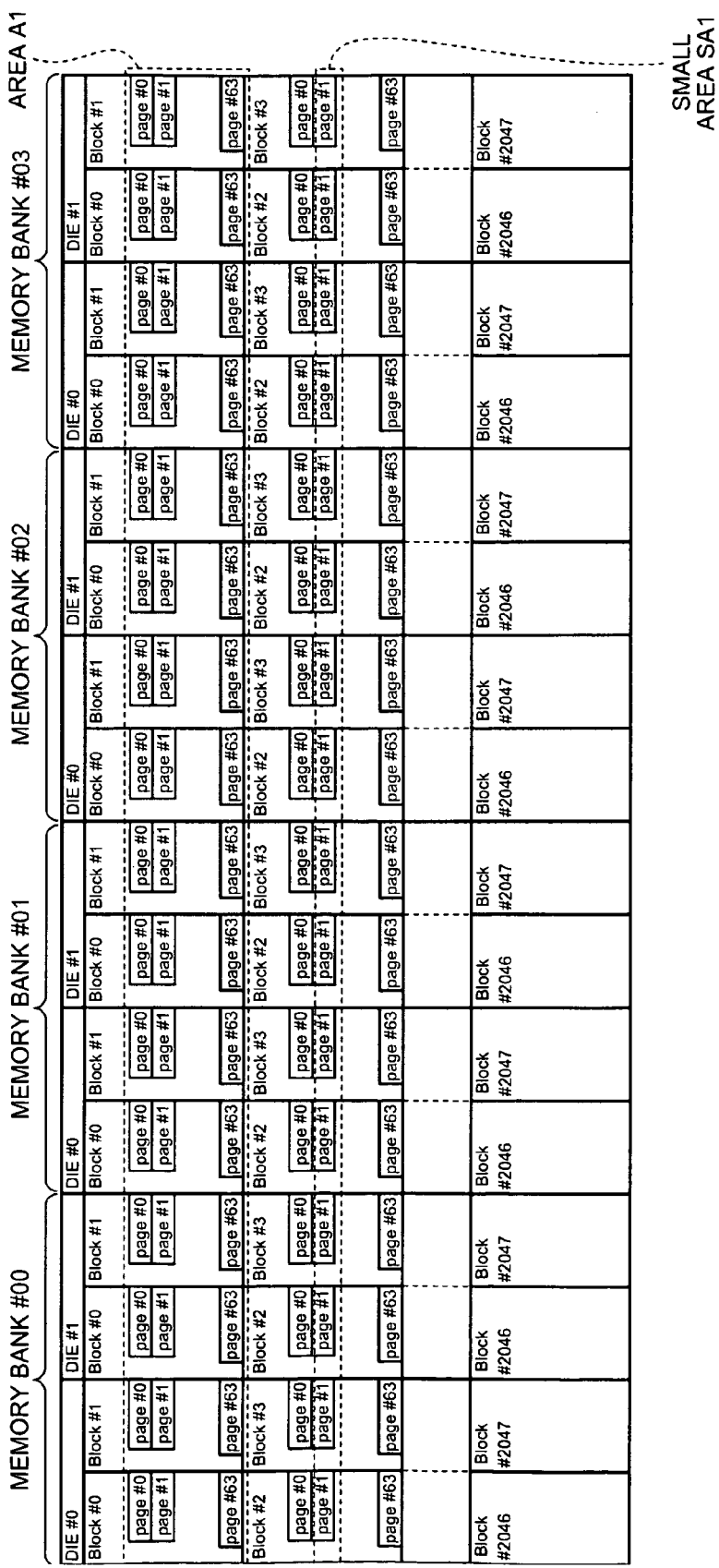

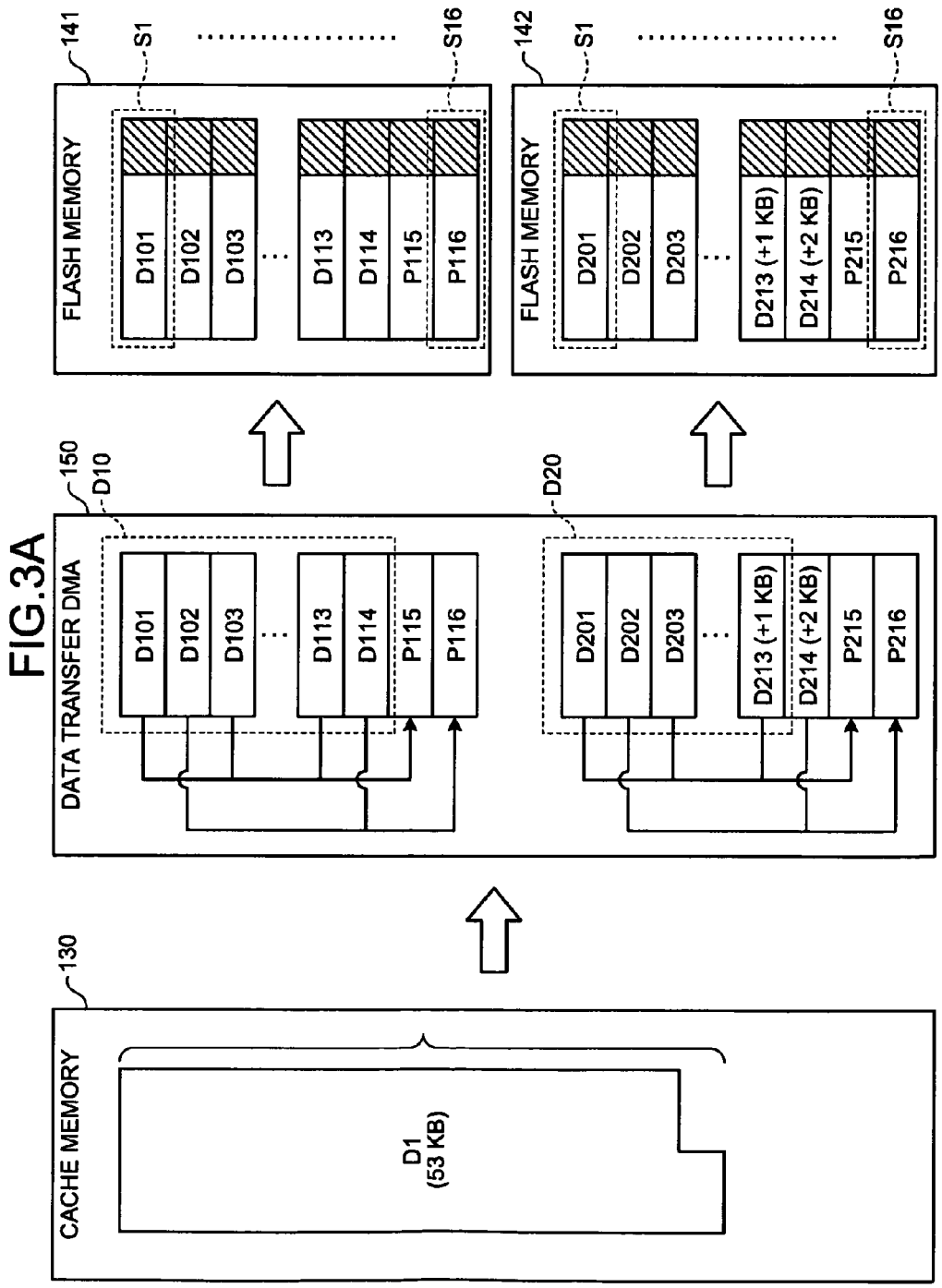

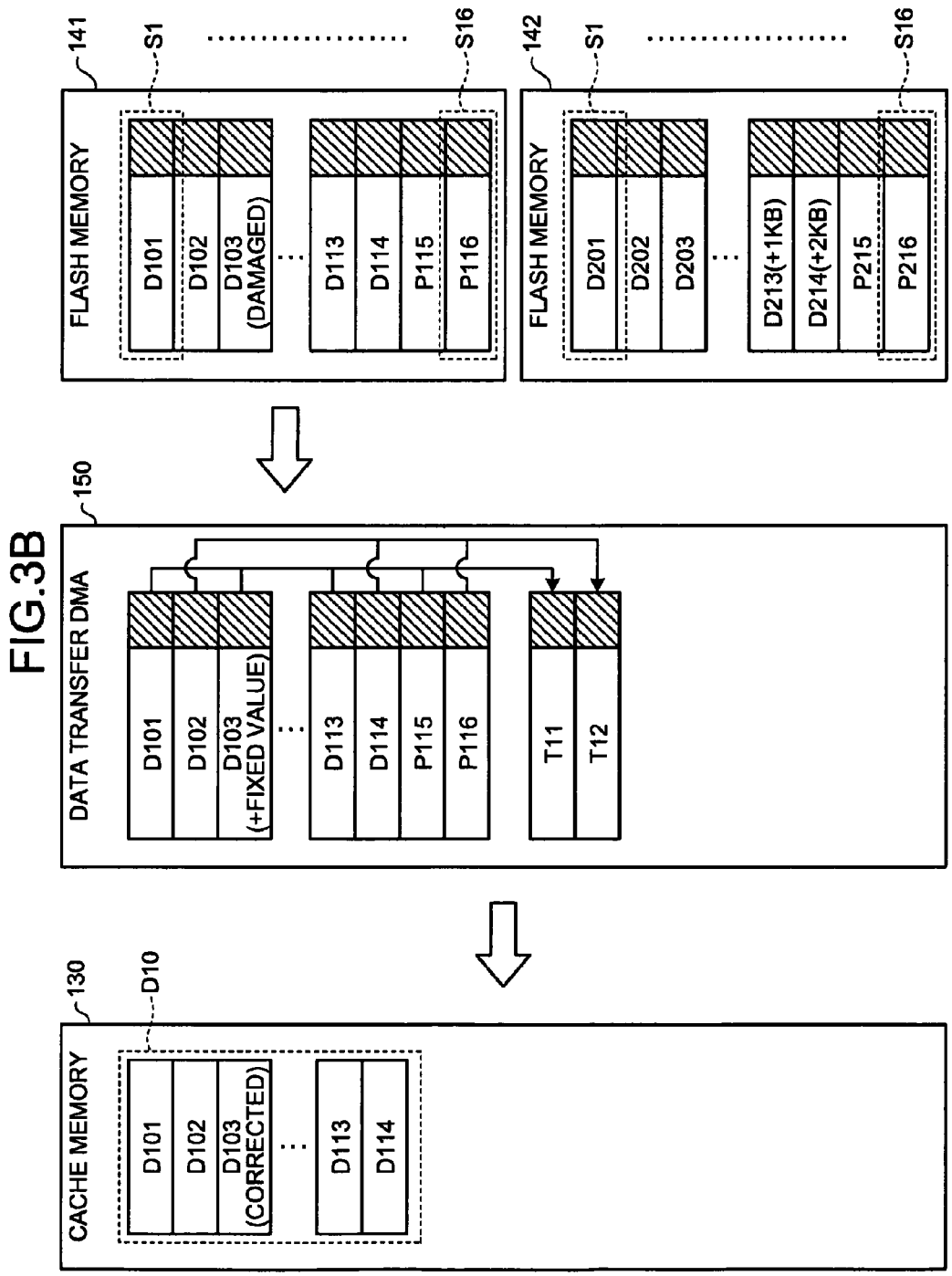

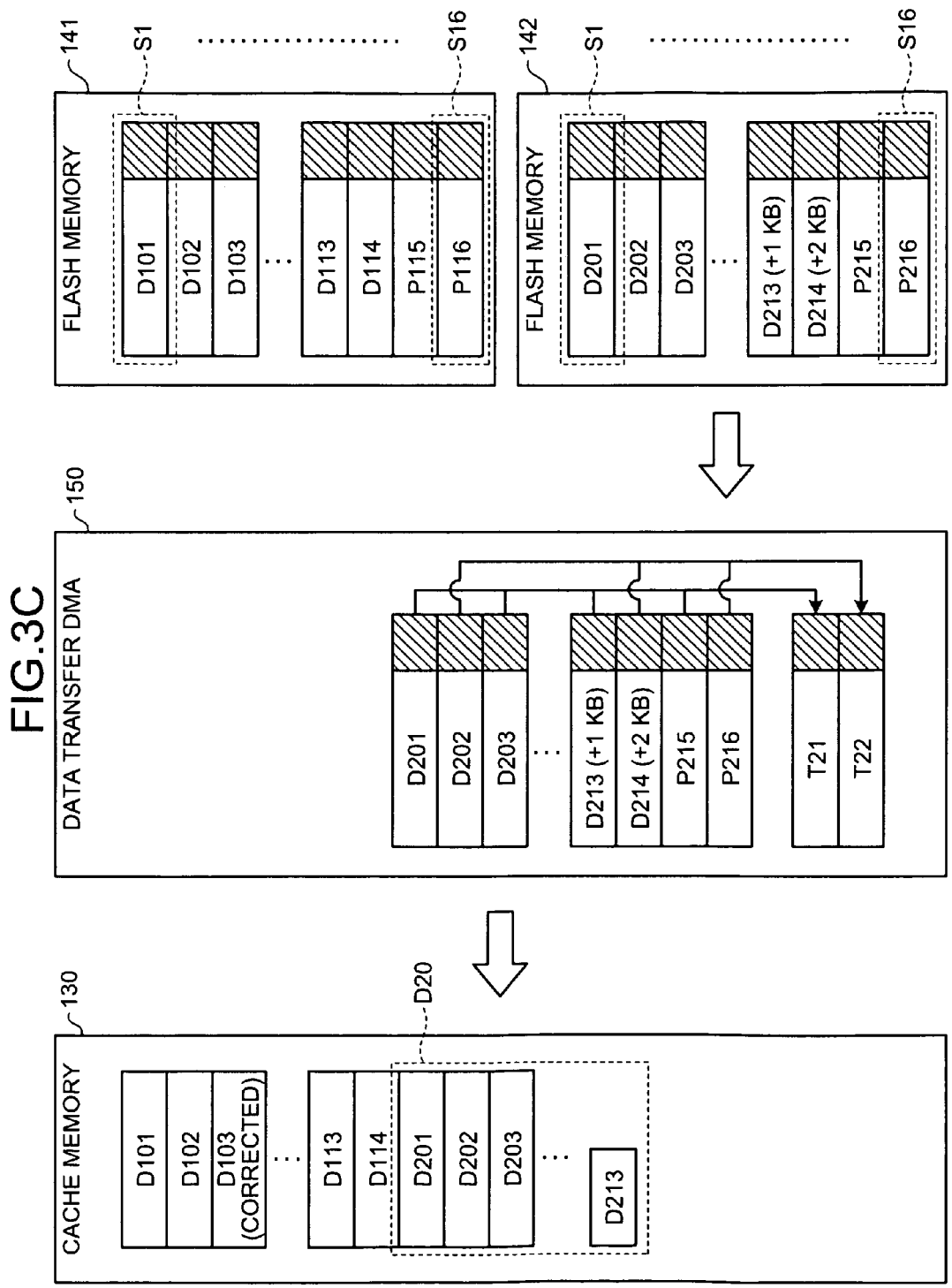

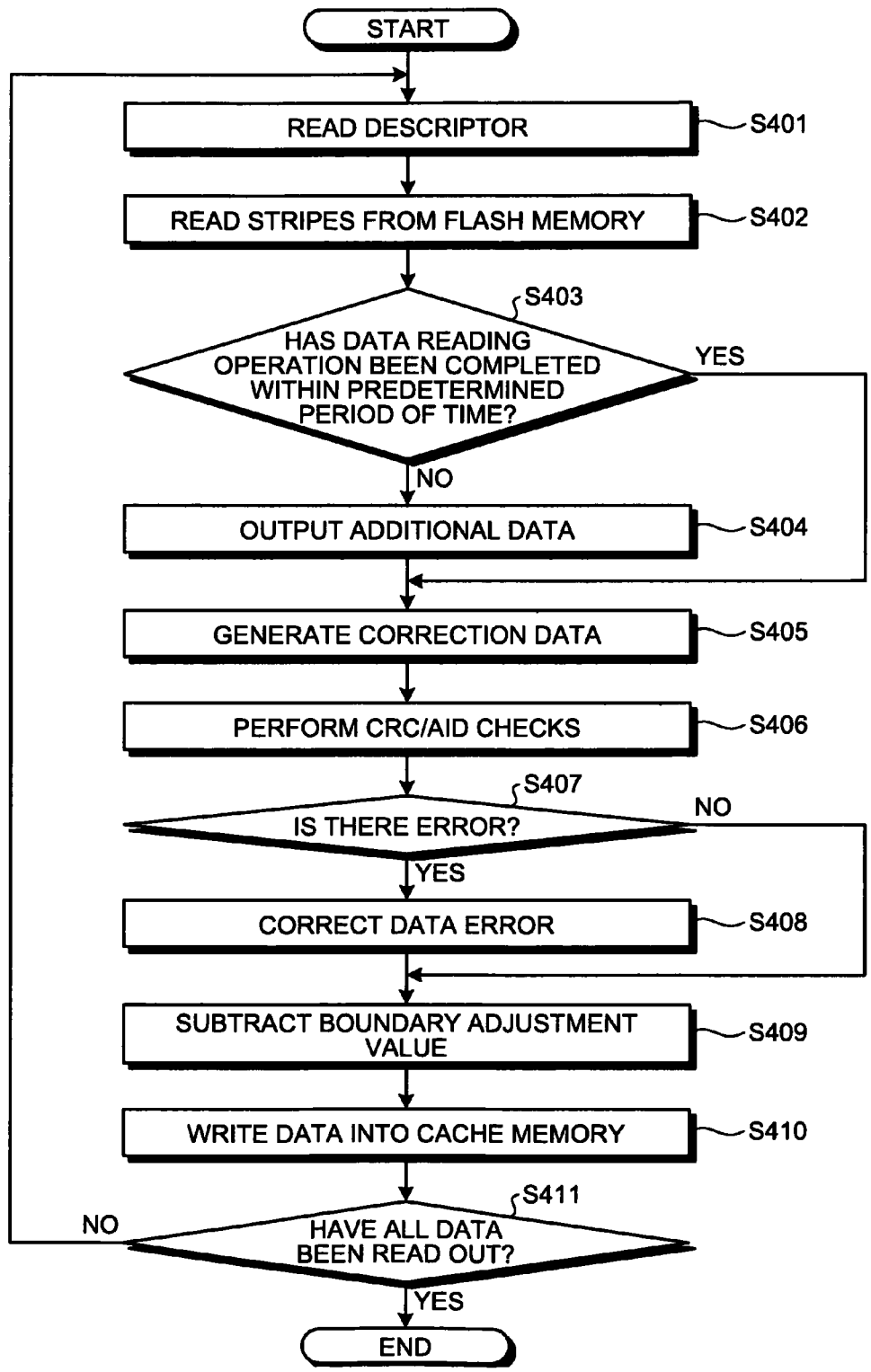

STORAGE DEVICE, STORAGE CONTROL DEVICE, DATA TRANSFER INTERGRATED CIRCUIT, AND STORAGE CONTROL METHOD

CROSS-REFERENCE TO RELATED APPLICATION

This application is a continuation of International Application No. PCT/JP2008/053494, filed on Feb. 28, 2008, the entire contents of which are incorporated herein by reference.

FIELD

The embodiments discussed herein are directed to a storage device, a storage control device, an integrated circuit for data transfers, and a storage control method.

BACKGROUND

In conventional large-scale computer systems, data is managed with the use of special-purpose data input/output devices configured independently of the host computer. Among the data input/output devices, storage devices form a Redundant Arrays of Independent (Inexpensive) Disks (RAID) group with hard disk drives (storage media), to increase the reliability of the data they are handling.

A storage device normally performs a write operation (a writing operation) of a so-called write-back method, to improve access performance. Specifically, where a storage device has received a data write instruction from the host computer as a host device, the storage device notifies the host computer that the write operation has been completed, when storing data into a cache memory. After that, when predetermined conditions are satisfied, the storage device stores the data stored in the cache memory into a hard disk drive.

Some of the storage devices using this write-back method are designed not to lose the data stored in volatile cache memories even when the power is turned off without a normal ending operation due to a blackout or the like (hereinafter, power cutting without a normal ending operation will be referred to as an "abnormal end").

Specifically, when a storage device ends abnormally, the data in the cache memory is saved into a nonvolatile memory while power is being supplied from a large-capacity capacitor or battery, and the data saved in the nonvolatile memory is restored to the cache memory when power is turned on after the abnormal end. In this manner, data cannot be lost even when a storage device abnormally ends while the data stored in the cache memory is not stored in a hard disk drive.

Nonvolatile memories into which data is to be saved are normally NAND flash memories. NAND flash memories sometimes damage or lose stored data due to cell degradation or the like. When the data stored in a nonvolatile memory is damaged or lost, the storage device reads wrong data from the nonvolatile memory at the time of activation after an abnormal end, and fails to restore data accurately.

To counter this problem, an error may be detected from the data stored in a storage medium, and a data correction may be performed at the time of the error detection (see Japanese National Publication of International Patent Application No. 2004-506256 and Japanese Laid-open Patent Publication No. 2007-193449, for example). By such a technique, the data saved in a nonvolatile memory can be restored to the cache memory at the time of activation after an abnormal end.

However, where there is not a read response from a nonvolatile memory even when the technique disclosed in Japanese National Publication of International Patent Application No. 2004-506256 and Japanese Laid-open Patent Publication No. 2007-193449 is utilized, the data saved in the nonvolatile memory cannot be accurately restored to the cache memory. Depending on the degradation of the nonvolatile memory, a read response might not be made from the nonvolatile memory. Such a situation results in a hung-up state, and a data correcting operation is not performed.

Large-scale data input/output devices such as storage devices are often used in important computer systems, and therefore, not being able to accurately restore the user data and system data stored in a cache memory leads to a serious problem. Therefore, how to restore accurately the data stored in a nonvolatile memory to the cache memory even when there is not a read response from a nonvolatile memory has been a crucial issue.

SUMMARY

According to an aspect of an embodiment of the invention, a storage device disclosed in this application includes a data transfer unit that stores to-be-transferred data into a nonvolatile memory, when an abnormal end occurs, the to-be-transferred data including to-be-saved data stored in a cache memory and parity data for correcting a data error in the to-be-saved data, with an error detection code for detecting a data error being added to the to-be-saved data and the parity data; a data reading unit that reads stripes from the nonvolatile memory when power is supplied to the storage device after an abnormal end, the stripes being formed by dividing the to-be-transferred data by a predetermined stripe size; an additional data adding unit that adds additional data to a stripe until a size of the stripe becomes equal to the stripe size, when the data reading unit does not finish reading the stripe within a predetermined period of time; a data error checking unit that determines whether a data error exists in the stripes, based on the error detection code added to the stripes read out by the data reading unit; a data correcting unit that corrects a data error, using the stripes read out by the data reading unit, when the data error checking unit detects the data error; and a data writing unit that writes into the cache memory to-be-saved data contained in stripes not having a data error detected by the data error checking unit, and writes into the cache memory to-be-saved data contained in stripes having a data error corrected by the data correcting unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2A is a diagram illustrating the structure and data format of a flash memory 141;

FIG. 3A is a diagram for outlining a data saving operation to be performed by the storage device according to the first embodiment;

FIG. 3B is a diagram for outlining a data restoring operation to be performed by the storage device according to the first embodiment;

FIG. 3C is a diagram for outlining the data restoring operation to be performed by the storage device according to the first embodiment;

FIG. 11 is a flowchart illustrating the data restoring operation procedures to be performed by the read DMA;

DESCRIPTION OF EMBODIMENTS

Preferred embodiments of the present invention will be explained with reference to accompanying drawings. It should be understood that these embodiments do not limit the invention.

[a] First Embodiment

Figure 1:
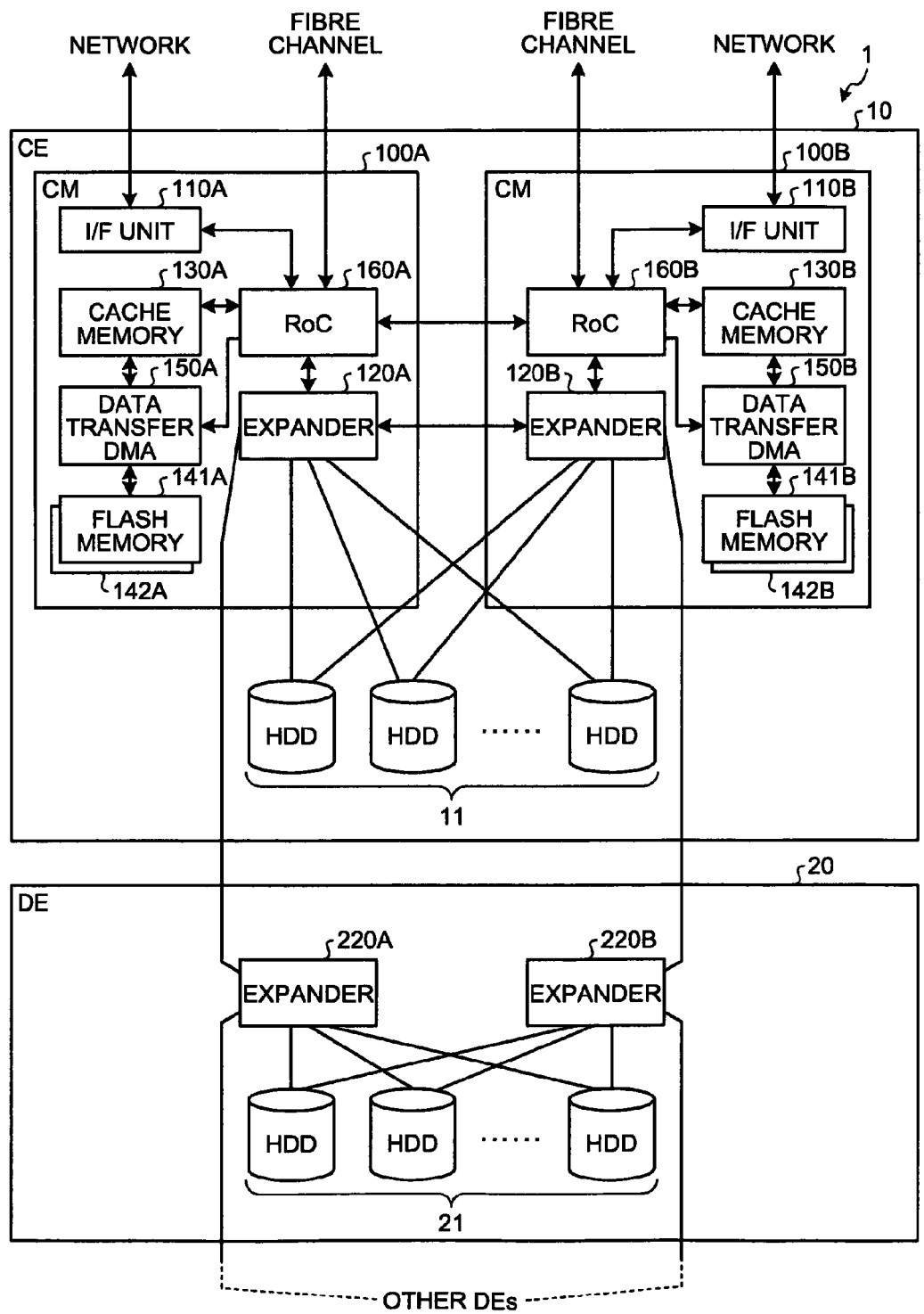
FIG. 1 is a schematic view illustrating the structure of a storage device according to a first embodiment.

First, the structure of a storage device according to a first embodiment is outlined. FIG. 1 is a drawing schematically illustrating the structure of a storage device 1 according to the first embodiment. The storage device 1 illustrated in the drawing has a duplex structure to secure high reliability, and each component is provided for the two structures (distinguished from each other by adding "A" and "B" to the reference numerals in the diagram). Since the same components in the respective structures have the same functions as each other, only the components of one of the structures are described in the following.

As illustrated in the drawing, the storage device 1 has separate housings: a Controller Enclosure (CE) 10 in which each unit for controlling the storage device 1 and a communication module designed to perform communications between the storage device 1 and a host computer as a host device are mainly mounted; and a Device Enclosure (DE) 20 in which hard disk drives are mainly mounted.

The CE 10 is connected to the host computer through a fibre channel via a channel adaptor (not illustrated), and is connected to the DE 20 via expanders 120A and 120B. The DE 20 includes hard disk drives (hereinafter abbreviated as "HDDs") 21, and can connect expanders 220A and 220B to other DEs directly or via a router or the like.

The CE 10 includes Controller Modules (CMs) 100A and 100B for controlling the storage device 1, and hard disk drives 11 connected to the CMs 100A and 100B.

The HDDs 11 are memory devices from and into which the CM 100A reads and write data redundantly. The memory devices connected to the CM 100A are not limited to hard disk drives, and may be other memory devices such as thermomagnetic disk devices, magneto-optic disk devices, or semiconductor disks using nonvolatile semiconductor memories.

The CM 100A is a storage control device that controls the storage device 1, and includes an interface (hereinafter abbreviated as "I/F") unit 110A, the expander 120A, a cache memory 130A, flash memories 141A and 142A, a data transfer DMA (Direct Memory Access) 150A, and a Raid-on-Chip (hereinafter abbreviated as "RoC") 160A.

The I/F unit 110A is an interface for connecting to a network such as a Local Area Network (LAN). The expander 120A is a relay device that relays data transmitted and received between the RoC 160A and the HDDs 11.

The cache memory 130A is a memory that temporarily stores data to be transferred between the host computer and the HDDs 11. The flash memories 141A and 142A are nonvolatile memories, such as NAND flash memories. In the storage device 1 according to the first embodiment, OneNAND flash memories are used as the flash memories 141A and 142A.

Here, the structures and data formats of the OneNAND flash memories 141A and 142A are described. Since the structure and data format of the flash memory 141A are the same as the structure and data format of the flash memory 142A, only the structure and the data format of the flash memory 141A are described herein.

FIG. 2A is a diagram illustrating the structure and data format of the flash memory 141A. The storage capacity of the flash memory 141A is 2 [GB (gigabytes)]. As illustrated in the drawing, the flash memory 141A includes four memory banks #00 through #03. The memory banks #00 through #03 are a set of memories, and each of them has a die #0 and a die #1.

Each of the die #0 and the die #1 is a flash memory of a several millimeters square, and includes Blocks #0 through #2047. Each of the Blocks #0 through #2047 includes pages #0 through #63. Page is the smallest access unit for accessing the flash memory 141.

Figure 2B:
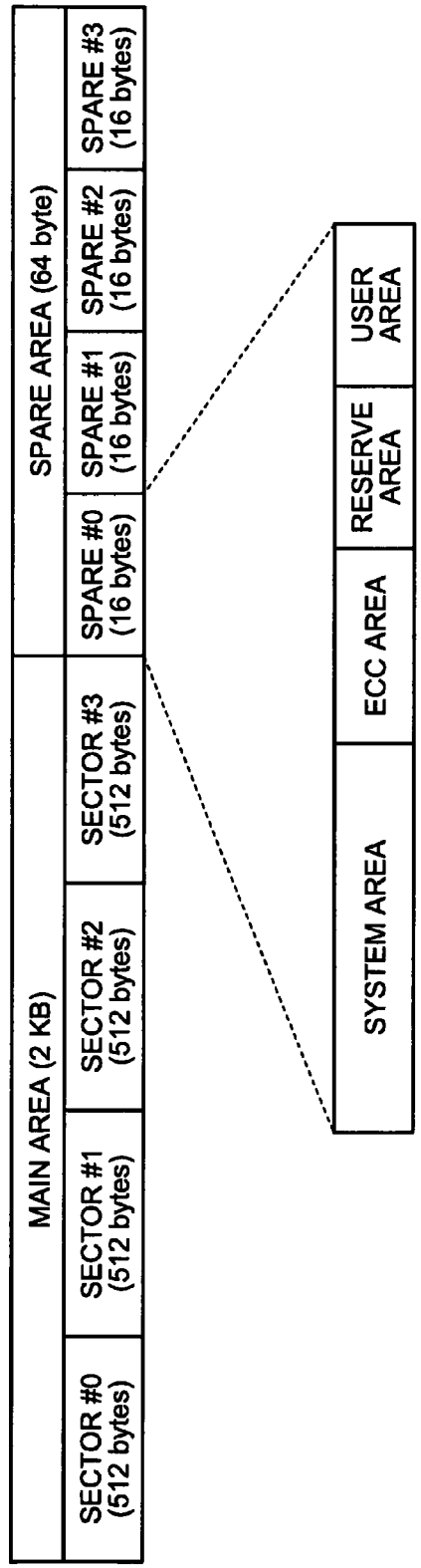
FIG. 2B is a diagram illustrating the structure and data format of a page illustrated in FIG. 2A.

The structure and data format of each page are described. FIG. 2B is a diagram illustrating the structure and data format of each page illustrated in FIG. 2A. As illustrated in this diagram, each page has a main area and a spare area.

The main area is a 2 [KB (kilobytes)] storage area in which user data is stored, and has four sectors #0 through #3. The spare area is a 64 [bytes] storage area in which system data and the likes for managing data are mainly stored, and has four spares #0 through #3.

One (the spare #0, for example) of the spares constituting the spare area has a system area, an Error Correcting Code (ECC) area, a reserve area, and a user area, as illustrated in the drawing.

The system area is a storage area in which various kinds of information such as defective sector information are stored. The ECC area is an area in which an ECC generated by the flash memory 141A is stored. The flash memory 141A makes an error check, using the ECC. If an error is detected, the flash memory 141A issues a notification that an ECC check error has occurred. The reserve area is an extra area. The user area is a storage area in which the data necessary for data management is stored by the system that stores data into the flash memory 141A.

Referring back to FIG. 1, the data transfer DMA 150A is a DMA circuit that performs data transmission and reception between the cache memory 130A and the flash memories 141A and 142A through DMA. This data transfer DMA 150A is realized by a Field Programmable Gate Array (FPGA), for example.

The RoC 160A is a control device that controls the entire CM 100A. The RoC 160A controls the interface with the host computer, and manages the cache memory 130A. When receiving a data write instruction from the host computer, the RoC 160A stores the relevant data into the cache memory 130A. When storing the data into the cache memory 130A, the RoC 160A notifies the host computer that the writing operation has been completed. When predetermined conditions are satisfied after that, the data stored in the cache memory 130A is written into the HDDs 11.

When the storage device 1 ends abnormally, the RoC 160A instructs the data transfer DMA 150A to perform an operation to save the data stored in the cache memory 130A into the flash memories 141A and 142A (hereinafter referred to as the "data saving operation"). When the storage device 1 starts after the abnormal end, the RoC 160A also instructs the data transfer DMA 150A to perform an operation to restore the data saved in the flash memories 141A and 142A to the cache memory 130A (hereinafter referred to as the "data restoring operation").

Referring now to FIGS. 3A through 3C, the data saving operation and the data restoring operation to be performed by the storage device 1 according to the first embodiment are outlined. FIG. 3A is a drawing for outlining the data saving operation to be performed by the storage device 1 according to the first embodiment. In the following, the "A" and "B" added to the reference numerals illustrated in FIG. 1 are not used. For example, a cache memory 130 illustrated in FIG. 3A is equivalent to the cache memory 130A or 130B illustrated in FIG. 1.

As illustrated in FIG. 3A, 53 [KB] data D1 is stored in the cache memory 130. Since the storage device 1 ends abnormally in this situation, an RoC 160 instructs a data transfer DMA 150 to save the data D1. Receiving the instruction, the data transfer DMA 150 reads the data D1 from the cache memory 130. Hereinafter, the data to be saved by the data transfer DMA 150 from the cache memory 130 when the storage device 1 ends abnormally will be referred to as the "to-be-saved data".

The data transfer DMA 150 then divides the data D1 by 28 [KB]. Specifically, the data transfer DMA 150 divides the data D1 into 28 [KB] data D10 and 25 [KB] data D20. The size (28 [KB] in the above described example) by which the data transfer DMA 150 divides the to-be-saved data (the data D1 in the above described example) is determined beforehand by the system. This size will be hereinafter referred to as the "boundary size"), and each set of the to-be-saved data that is divided by the boundary size will be referred to as the "boundary data". In the storage device 1 according to the first embodiment, the boundary size is set at 28 [KB].

The data transfer DMA 150 then divides the data D10 by 2 [KB]. Specifically, the data transfer DMA 150 divides the data D10 into 14 sets of data D101 through D114, as illustrated in the drawing. The size (2 [KB] in the above described example) by which the data transfer DMA 150 divides the boundary data (the data D10 and D20 in the above described example) is determined beforehand by the system. In the storage device 1 according to the first embodiment, the boundary size is set at 2 [KB]. Hereinafter, each set (such as data D101) of the boundary data divided by 2 [KB] will be referred to as "to-be-saved unit data", and the number for identifying a set of to-be-saved unit data will be referred to as the "to-be-saved unit data number". In this specification, the numeric portions of the reference numerals denoting the to-be-saved unit data are the to-be-saved unit data numbers. For example, the to-be-saved unit data number of the data D101 is "101".

The data transfer DMA 150 then performs an exclusive OR (hereinafter referred to as "XOR") operation on the seven sets of data D101, D103, . . . , and D113 having odd numbers as the to-be-saved unit data numbers, to generate parity data P115. The data transfer DMA 150 also performs an XOR operation on the seven sets of data D102, D104, . . . , and D114 having even numbers as the to-be-saved unit data numbers, to generate parity data P116.

The size of the parity data P115 and P116 is 2 [KB], which is the same as the size of the data D101 through D114. Accordingly, the total size of the data D10 divided by the boundary size 28 [KB] and the parity data P115 and P116 generated from the data D10 is 32 [KB]. Hereinafter, the parity data will also be referred to as the "to-be-saved unit data".

After that, the data transfer DMA 150 generates a Cyclic Redundancy Check (CRC) for each of the data D101 through D114. Likewise, the data transfer DMA 150 generates a CRC for each of the parity data P115 and P116. The data transfer DMA 150 then adds the generated CRCs to the data D101 through D114 and the parity data P115 and P116.

The data transfer DMA 150 also adds identification numbers (hereinafter referred to as "Area Identifications (AIDS)") for identifying the data D101 through D114 and the parity data P115 and P116, to the data D101 through D114 and the parity data P115 and 116. The AIDs will be described later in detail.

The data transfer DMA 150 then writes the data D101 through D114 having the CRCs and AIDs added thereto, and the parity data P115 and P116 having the CRCs and the AIDs added thereto into the flash memory 141. In other words, the data transfer DMA 150 writes sixteen sets of to-be-saved unit data (fourteen sets of data D101 through D114, and two sets of parity data P115 and P116) into the flash memory 141.

Here, the data transfer DMA 150 writes four sets of to-be-saved unit data into each of the four memory banks #00 through #03 contained in the flash memory 141. At this point, the data transfer DMA 150 also writes two sets of to-be-saved unit data into each of the two dies #0 and #1 contained in each of the memory banks #00 through #03. The data transfer DMA 150 also writes one set of to-be-saved unit data having an odd number as the to-be-saved unit data number and one set of to-be-saved unit data having an even number as the to-be-saved unit data number into each of predetermined two Blocks contained in the dies #0 and #1.

Hereinafter, each area into which the data transfer DMA 150 writes sixteen sets of to-be-saved unit data in the flash memory 141 will be referred to as a "small area". A "small area" is the small area SA1 illustrated in FIG. 2A, for example.

A data writing operation to be performed by the data transfer DMA 150 is now described by way of an example case where the data transfer DMA 150 writes the data D101 through D114 and the parity data P115 and P116 into the small area AS1 illustrated in FIG. 2A. Hereinafter, "page #S contained in Block #R of die #Q of memory bank #P" will be referred to as the "memory bank #P/die #Q/Block #R/page #S".

In such a case, the data transfer DMA 150 writes the data D101 into the main area of the memory bank #00/die #0/Block #2/page #1. The data transfer DMA 150 writes the data D102 into the main area of the memory bank #00/die #0/Block #3/page #1, and writes the data D103 into the main area of the memory bank #00/die #1/Block #2/page #1. The data transfer DMA 150 writes the data D104 through D113 in the same manner as above, and writes the data D114 into the memory bank #03/die #0/Block #3/page #1. The data transfer DMA 150 also writes the parity data P115 into the memory bank #03/die #1/Block #2/page #1, and writes the parity data P116 into the memory bank #03/die #1/Block #3/page #1.

The data transfer DMA 150 then writes the CRC added to the respective to-be-saved unit data into the user areas in the spare areas of pages. In a case where the data D101 is written into the main area of the memory bank #00/die #0/Block #2/page #1 as in the above example, the data transfer DMA 150 writes the CRC of the data D101 into the user area in spare #0 of the memory bank #00/die #0/Block #2/page #1. Likewise, the data transfer DMA 150 writes the CRCs of the data D102 through S114 and the parity data P115 and P116 into the user areas of pages.

The data transfer DMA 150 also writes the AIDs added to the respective to-be-saved unit data into the user areas in the spare areas of pages. In a case where the CRC of the data D101 is written into the user area in spare #0 of the memory bank #00/die #0/Block #2/page #1 as in the above example, the data transfer DMA 150 writes the AID of the data D101 into the user area in spare #1 of the memory bank #00/die #0/Block #2/page #1. Likewise, the data transfer DMA 150 writes the AIDs of the data D102 through D114 and the parity data P115 and P116 into the user areas of pages.

In this manner, the data transfer DMA 150 writes sixteen sets of to-be-saved unit data into the small area. Hereinafter, all the data (such as the to-be-saved unit data, the CRCs, and the AIDs) stored in one page in the small area will be referred to as a "stripe", and the number for identifying a stripe in the small area will be referred to as a "stripe number". In this specification, the last two digits of each reference numeral added to the to-be-saved unit data is a stripe number. For example, the stripe number of the stripe stored in the page storing the parity data P115 is "15". Hereinafter, the stripe of the stripe number "N" will be referred to simply as the stripe S "N".

The rectangles indicating "D101", "P115", and the likes in the flash memory 141 illustrated in FIG. 3A represent the main areas of pages, and the shaded rectangles illustrated next to the respective main areas represent the spare areas of pages. Accordingly, in this drawing, the combination of the main area indicating "D101" and the spare area illustrated next to that main area is a stripe S1, for example.

Likewise, the data transfer DMA 150 writes the data D20 into a flash memory 142. Specifically, the data transfer DMA 150 divides the data D20 by 2 [KB]. Since the size of the data D20 is 25 [KB], which is smaller than the boundary size, 28 [KB], the data transfer DMA 150 adds the predetermined value, 3 [KB], to the data D20, so that the size of the data D20 becomes 28 [KB]. Hereinafter, the predetermined value will be referred to as the "boundary adjustment value". The reason that the boundary adjustment value is added when the size of the boundary data is smaller than the boundary size is to allow generation of parity data.

The data transfer DMA 150 then divides the data D20 having the boundary adjustment value added thereto by 2 [KB]. Specifically, the data transfer DMA 150 divides the data D20 having the 3 [KB] boundary adjustment value added thereto into fourteen sets of data D201 through D214.

The procedures after that are the same as the procedures in the above described operation to write the data D10 into the flash memory 141. The data transfer DMA 150 generates parity data P215 and P216, generates the CRCs of the data D201 and the likes, and writes the data D201 through D214, the parity data P215 and P216, the CRCs, and the AIDs into the flash memory 142.

In this manner, the data transfer DMA 150 writes the data D10 of the data D1 stored in the cache memory 130 into the flash memory 141, and the data D20 into the flash memory 142.

The data transfer DMA 150 is capable of writing data concurrently into two or more small areas. In the storage device 1 according to the first embodiment, the data transfer DMA 150 writes data simultaneously into sixty-four small areas at a maximum. Hereinafter, the sixty-four small areas will be referred to as an "area". An area is the area A1 illustrated in FIG. 2A, for example. The above described AIDs are identification numbers for identifying the stripes contained in one area. The AIDs are calculated by the RoC 160, and the data transfer DMA 150 receives the AIDs from the RoC 160.

Next, the data restoring operation to be performed by the storage device 1 according to the first embodiment is outlined. FIGS. 3B and 3C are diagrams for outlining the data restoring operation to be performed by the storage device 1 according to the first embodiment. In the flash memory 141 illustrated in FIGS. 3B and 3C, the data saved by the data transfer DMA 150 as illustrated in FIG. 3A is stored.

First, referring to FIG. 3B, the operation to restore the data D10 illustrated in FIG. 3A to the cache memory 130 is described. Here, the data D103 stored in the flash memory 141 illustrated in FIG. 3B is partially damaged due to degradation of the cells in the flash memory 141. When receiving a request to read the data D103, the flash memory 141 cannot respond to the read request.

When the storage device 1 starts after an abnormal end in such circumstances, the data transfer DMA 150 reads stripes of small areas from the flash memory 141. Specifically, the data transfer DMA 150 reads the stripes S1 through S16 from the flash memory 141.

While reading the stripe S3, the data transfer DMA 150 stops accepting a read response from the flash memory 141. When being unable to read the stripe S3 after a predetermined period of time has passed, the data transfer DMA 150 determines that a time-out has occurred for the stripe S3.

The data transfer DMA 150 then stops the operation to read the stripe S3 having the time-out, and sets the predetermined value equal to the size that it has failed to read in the stripe S3 (the predetermined value will be hereinafter referred to as the "additional data"). For example, if the data transfer DMA 150 stops accepting a read response from the flash memory 141 when having read 1 [KB] of the stripe S3, the data transfer DMA 150 adds 1 [KB] additional data to the read 1 [KB] data, to set 2 [KB] data as the stripe S3. After that, the data transfer DMA 150 resumes the data reading operation, and reads the stripes S4 through S16 from the flash memory 141.

While reading the stripes S1 through S16, the data transfer DMA 150 also performs CRC checks, AID checks, and XOR operations. Specifically, the data transfer DMA 150 determines whether a data error exists in the stripes S1 through S16, using the CRCs in the stripes S1 through S16. The data transfer DMA 150 also determines whether all the stripes S1 through S16 exist, using the AIDs in the stripes S1 through S16. The data transfer DMA 150 also performs an XOR operation on the stripes S1, S3, . . . , and S15 having odd stripe numbers, and generates correction data T11. The data transfer DMA 150 further performs an XOR operation on the stripes S2, S4, ..., and S16 having even stripe numbers, and generates correction data T12.

In the example illustrated in FIG. 3B, the data transfer DMA 150 detects the existence of a data error through a CRC check performed on the stripe S3 having the additional data set therein. If a time-out occurs before the AID contained in the stripe S3 is read out, the data transfer DMA 150 might determine that the data D103 is missing through an AID check performed on the stripe S3, since the additional data is set in the AID. At this point, the data transfer DMA 150 detects a data error only from the stripe S3, and determines that no errors have been detected through the CRC checks and AID checks performed on the stripes S1, s2, and S4 through S16.

After reading all the stripes S1 through S16, the data transfer DMA 150 writes into the cache memory 130 the data D101 and D102 contained in the stripes S1 and S2 from which no errors have been detected through the CRC checks and AID checks. Using the stripes S1, S5, S7, ..., and S15 having odd stripe numbers, and the correction data T11, the data transfer DMA 150 corrects the data error in the data D103 of the stripe S3 from which the error has been detected. The data transfer DMA 150 then writes the corrected data D103 into the cache memory 130. The data transfer DMA 150 further writes into the cache memory 130 the data D104 through D114 contained in the stripes S4 through S14 from which no errors have been detected. Since the stripes S15 and S16 are parity data, the data transfer DMA 150 does not write the parity data P115 and P116 contained in the stripes S15 and S16 into the cache memory 130. In this manner, the data transfer DMA 150 restores the data D10 to the cache memory 130.

Referring now to FIG. 3C, the operation to restore the data D20 illustrated in FIG. 3A to the cache memory 130 is described. As illustrated in the drawing, after completing the operation to restore the data D10, the data transfer DMA 150 performs CRC checks, AID checks, and XOR operations, while reading the stripes S1 through S16 from the flash memory 142. By doing so, the data transfer DMA 150 generates correction data T21 and T22. Here, the data transfer DMA 150 determines that a time-out has not occurred during the operation to read the stripes S1 through S16 from the flash memory 142. The data transfer DMA 150 also determines that no errors have been detected through the CRC checks and AID checks performed on the stripes S1 through S16.

After reading all the stripes S1 through S16, the data transfer DMA 150 writes the data D201 through 5212 contained in the stripes S1 through S12 into the cache memory 130. The data transfer DMA 150 then writes into the cache memory 130 the data D213 formed by subtracting the 1 [KB] boundary adjustment value from the data D213 contained in the stripe S13. Since all the data D214 contained in the stripe S14 is boundary adjustment values, the data transfer DMA 150 does not write the data D214 into the cache memory 130.

As described above, the storage device 1 according to the first embodiment generates the parity data of the to-be-saved data during the data saving operation, and writes the to-be-saved data and parity data having CRCs and AIDs added thereto into the flash memory 141 or 142. During the data restoring operation, if the operation to read data from the flash memory 141 or 142 is not completed within a predetermined period of time, the data reading operation is suspended, and the additional data is set. A data error is corrected with the use of the parity data, and the corrected data is written into the cache memory 130. Accordingly, even if there is not a data read response from the flash memory 141 or 142, the data saved in the flash memory 141 or 142 can be restored to the cache memory 130.

The storage device 1 according to the first embodiment is also designed to generate parity data with the use of the to-be-saved unit data having odd numbers as the to-be-saved unit data numbers, and generate parity data with the use of the to-be-saved unit data having even numbers as the to-be-saved unit data numbers. The storage device 1 is designed to write the to-be-saved unit data having odd numbers as the to-be-saved unit data numbers and the to-be-saved unit data having even numbers as the to-be-saved unit data numbers into one die in a small area. Accordingly, even if one die breaks down, the data stored in the broken die can be corrected. In other words, even if one die breaks down, the data saved in the flash memory 141 or 142 can be restored to the cache memory 130.

Figure 4:
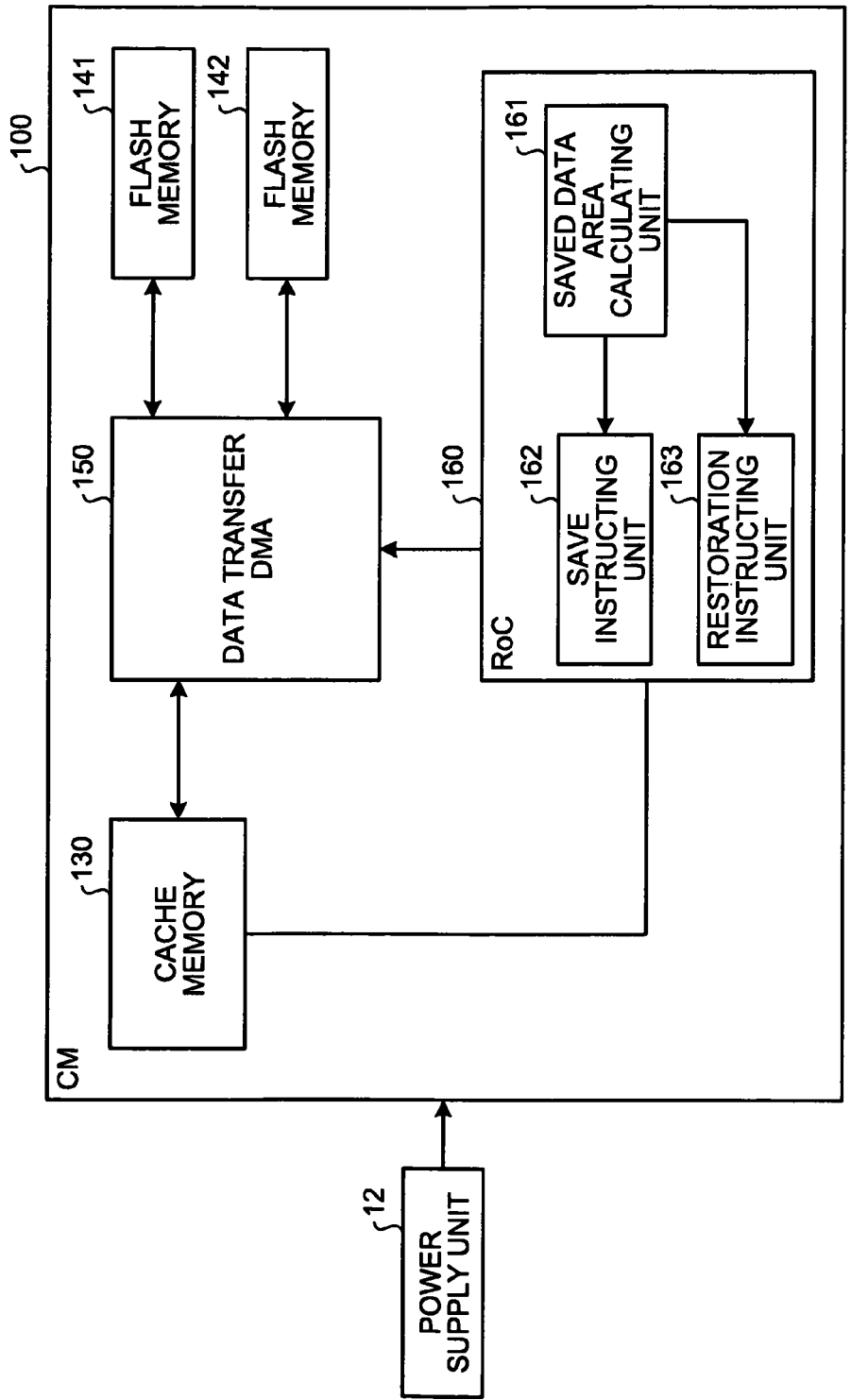
FIG. 4 is a diagram illustrating the structure of a CM included in the storage device according to the first embodiment.

Next, the structure of the CM 100 included in the storage device 1 according to the first embodiment is described. FIG. 4 is a drawing illustrating the structure of the CM 100 included in the storage device 1 according to the first embodiment. This drawing illustrates only the components related to the data saving operation and the data restoring operation.

As illustrated in the drawing, the CM 100 is connected to a power supply unit 12, and includes the cache memory 130, the flash memories 141 and 142, the data transfer DMA 150, and the RoC 160.

The power supply unit 12 is a device that supplies power to the CM 100 when the storage device 1 ends abnormally. For example, the power supply unit 12 is a large-capacity capacitor or battery. Although this drawing illustrates an example case where the power supply unit 12 located outside the CM 100 supplies power to the CM 100, the CM 100 may include the power supply unit 12.

As described above, the cache memory 130 is a memory that temporarily stores data to be transferred between the host computer and the HDDs 11. The flash memories 141 and 142 are nonvolatile memories, and the data transfer DMA 150 saves the data stored in the cache memory 130 into the flash memories 141 and 142 when the storage device 1 ends abnormally.

The data transfer DMA 150 is a DMA circuit that performs data transmission and reception between the cache memory 130 and the flash memories 141 and 142, according to an instruction from the RoC 160. Specifically, the data transfer DMA 150 performs the data saving operation to save the data stored in the cache memory 130 into the flash memories 141 and 142, when the storage device 1 has ended abnormally. When power is supplied to the storage device 1 after an abnormal end, the data transfer DMA 150 performs the data restoring operation to restore the data saved in the flash memories 141 and 142 to the cache memory 130. The structure of the data transfer DMA 150, and the data saving operation and the data restoring operation to be performed by the data transfer DMA 150 will be described later in detail.

The RoC 160 is a control device that controls the entire CM 100, and includes a saved data area calculating unit 161, a save instructing unit 162, and a restoration instructing unit 163. When the storage device 1 ends abnormally, the saved data area calculating unit 161 is a processing unit that calculates various kinds of information to be required for instructing the data transfer DMA 150 to perform the data saving operation.

Specifically, the saved data area calculating unit 161 calculates the size of the data to be saved by the data transfer DMA 150, the storage location of the data to be saved by the data transfer DMA 150, the size of the boundary adjustment value, and the likes, based on the size of the to-be-saved data and the storage location (the address) of the to-be-saved data in the cache memory 130.

The save instructing unit 162 is a processing unit that instructs the data transfer DMA 150 to perform the data saving operation. Specifically, when the storage device 1 ends abnormally, the save instructing unit 162 generates an instruction to perform the data saving operation (hereinafter referred to as the "data save descriptor"), and transmits it to the data transfer DMA 150.

This data save descriptor contains various kinds of information calculated by the saved data area calculating unit 161. Specifically, the data save descriptor contains the storage location at the beginning (the beginning address) of the to-be-saved data in the cache memory 130, the size of the to-be-saved data, the size of the boundary adjustment value, the AID, and the likes.

The restoration instructing unit 163 is a processing unit that instructs the data transfer DMA 150 to perform the data restoring operation. Specifically, when power is supplied to the storage device 1 after an abnormal end, the restoration instructing unit 163 generates an instruction to perform the data restoring operation (hereinafter referred to as the "data restoration descriptor"), and transmits it to the data transfer DMA 150. This data restoration descriptor contains the size of the boundary adjustment value to be subtracted, and the likes.

When the data transfer DMA 150 has completed the data restoring operation, the restoration instructing unit 163 also generates an instruction to erase the data stored in the flash memories 141 and 142 (hereinafter referred to as the "erase descriptor"), and transmits it to the data transfer DMA 150.

Figure 5:
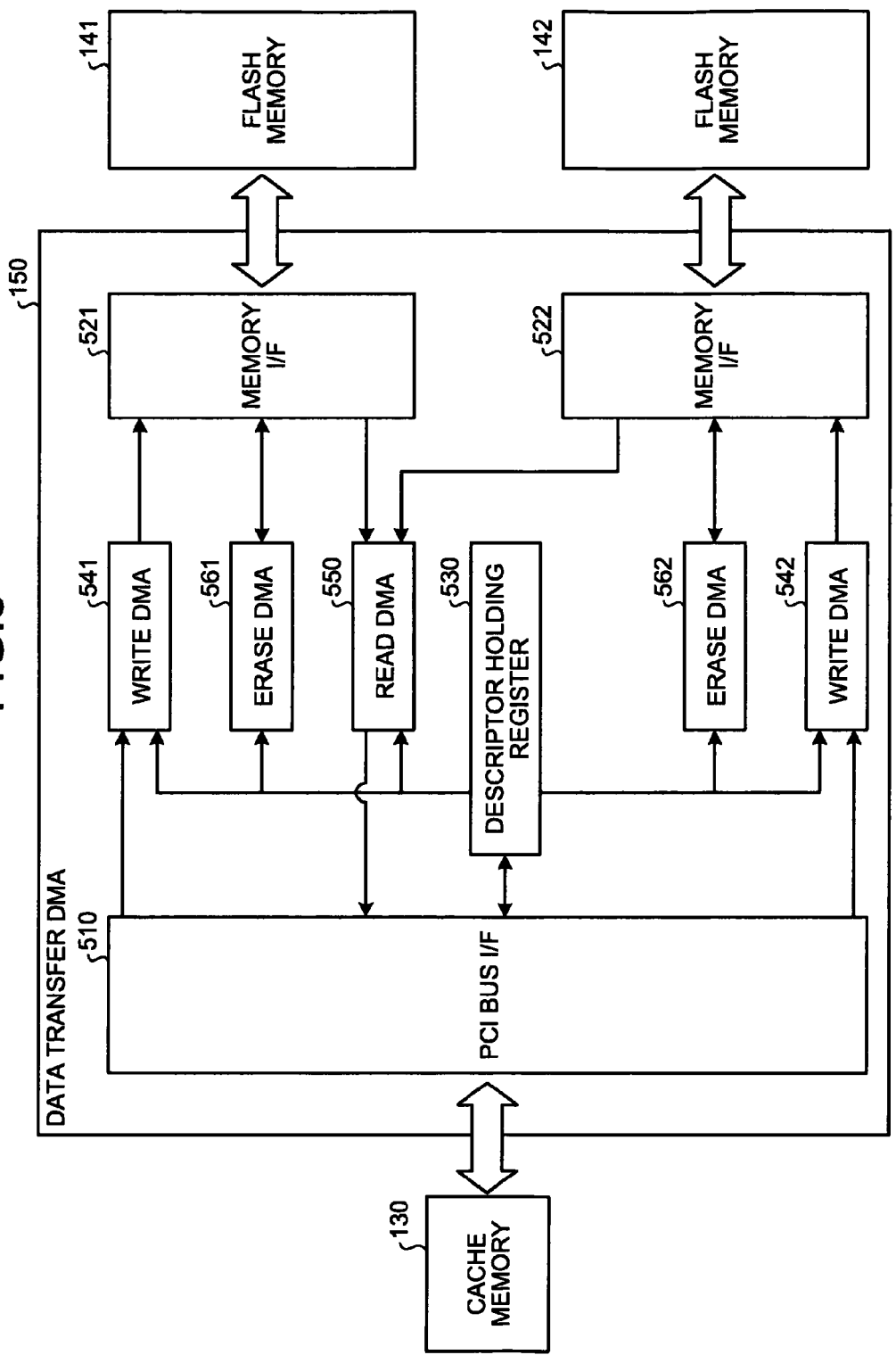
FIG. 5 is a diagram illustrating the structure of the data transfer DMA illustrated in FIG. 4.

Next, the structure of the data transfer DMA 150 is described. FIG. 5 is a diagram illustrating the structure of the data transfer DMA 150 illustrated in FIG. 4. As illustrated in the drawing, the data transfer DMA 150 includes a Peripheral Component Interconnect (PCI) bus I/F 510, memory I/Fs 521 and 522, a descriptor holding register 530, write DMAs 541 and 542, a read DMA 550, and erase DMAs 561 and 562.

The PCI bus I/F 510 is an interface that performs data transmission and reception between the data transfer DMA 150 and the cache memory 130. The memory I/F 521 is an interface that performs data transmission and reception between the data transfer DMA 150 and the flash memory 141. The memory I/F 522 is an interface that performs data transmission and reception between the data transfer DMA 150 and the flash memory 142.

The descriptor holding register 530 is a register that stores various descriptors received from the RoC 160. Specifically, the descriptor holding register 530 stores the data save descriptor, the data restoration descriptor, the erase descriptor, and the likes.

The write DMAs 541 and 542 are DMA circuits that perform data saving operations. Specifically, when receiving the data save descriptor from the descriptor holding register 530, the write DMA 541 acquires the data stored in the cache memory 130 via the PCI bus I/F 510. The write DMA 541 then writes the acquired data into the flash memory 141 via the memory I/F 521. Likewise, when receiving the data save descriptor from the descriptor holding register 530, the write DMA 542 acquires the data stored in the cache memory 130, and writes the acquired data into the flash memory 142.

The write DMAs 541 and 542 concurrently perform the operation to transfer data from the cache memory 130 to the flash memory 141 or 142. In the example illustrated in FIG. 3A, the write DMA 541 performs the operation to write the data D10 into the flash memory 141, and the write DMA 542 performs the operation to write the data D20 into the flash memory 142. In this manner, the write DMAs 541 and 542 concurrently perform the data saving operations.

As described above, the storage device 1 has the two flash memories 141 and 142 and the two write DMAs 541 and 542, and causes the write DMAs 541 and 542 to concurrently perform the data saving operations. By doing so, the storage device 1 becomes capable of efficiently performing the data saving operation, and completing the data saving operation within the short period of time in which power is supplied from the power supply unit 12.

The read DMA 550 is a DMA circuit that performs the data restoring operation. Specifically, when receiving a data restoration descriptor from the descriptor holding register 530, the read DMA 550 acquires data stored in the flash memory 141, and stores the acquired data into the cache memory 130. Likewise, when receiving a data restoration descriptor, the read DMA 550 acquires the data stored in the flash memory 142, and stores the acquired data into the cache memory 130.

The reason that the storage device 1 according to the first embodiment causes the two write DMAs 541 and 542 to perform the data waving operation while causing the single read DMA 550 to perform the data restoring operation is now described. While the data saving operation is required to be completed within the short period of time during which power is supplied from the power supply unit 12, the data restoring operation does not have such a restriction imposed thereon.

However, the number of write DMAs and the number of read DMAs included in the data transfer DMA 150 are not limited to the example case illustrated in FIG. 5. For example, the data transfer DMA 150 may include three write DMAs or ten read DMAs.

The erase DMA 561 is a DMA circuit that erases the data stored in the flash memory 141, when receiving an erase descriptor from the descriptor holding register 530. Likewise, the erase DMA 562 is a DMA circuit that erases the data stored in the flash memory 142, when receiving an erase descriptor from the descriptor holding register 530.

Figure 6:
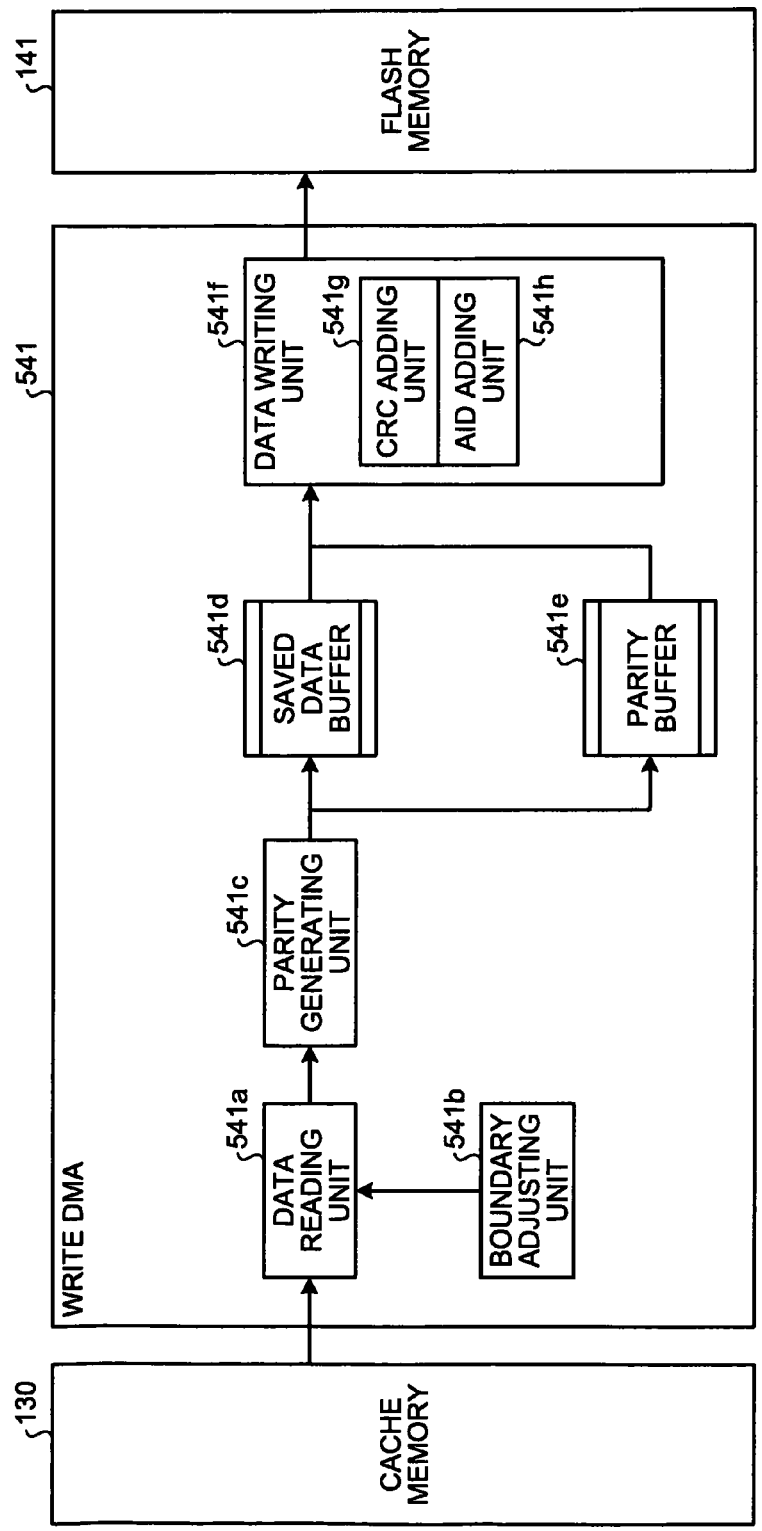
FIG. 6 is a diagram illustrating the structure of a write DMA illustrated in FIG. 5.

Next, the structures of the write DMAs 541 and 542 are described. FIG. 6 is a diagram illustrating the structure of each of the write DMAs 541 and 542 illustrated in FIG. 5. Since the write DMAs 541 and 542 have the same structures, only the structure of the write DMA 541 is now described.

As illustrated in the drawing, the write DMA 541 includes a data reading unit 541a, a boundary adjusting unit 541b, a parity generating unit 541c, a saved data buffer 541d, a parity buffer 541e, and a data writing unit 541f.

The data reading unit 541a is a processing unit that reads data of a predetermined size from the cache memory 130. Specifically, the data reading unit 541a reads data of a size equivalent to the size of the to-be-saved data from the beginning address of the to-be-saved data contained in the data save descriptor.

The boundary adjusting unit 541b is a processing unit that adds a boundary adjustment value to the to-be-saved data read out by the data reading unit 541a. Specifically, the boundary adjusting unit 541b adds a boundary adjustment value of a size equivalent to the boundary adjustment value contained in the data save descriptor.

The parity generating unit 541c is a processing unit that generates parity data, using the to-be-saved data read out by the data reading unit 541a. Specifically, the parity generating unit 541c divides the to-be-saved data by the boundary size, which is 28 [KB], to form sets of boundary data. The parity generating unit 541c further divides the boundary data by 2 [KB], which is the size that is set beforehand by the system.

The parity generating unit 541c generates parity data, using seven sets of to-be-saved unit data having odd numbers as their to-be-saved unit data numbers. The parity generating unit 541c also generates parity data, using seven sets of to-be-saved unit data having even numbers as their to-be-saved unit data numbers. The parity generating unit 541c stores the to-be-saved data read out by the data reading unit 541a into the saved data buffer 541d, and stores the generated parity data into the parity buffer 541e.

The saved data buffer 541d is a memory device that temporarily stores data, and the parity generating unit 541c stores the to-be-saved data into the saved data buffer 541d, as described above. The parity buffer 541e is a memory device that temporarily stores data, and the parity generating unit 541c stores the parity data into the parity buffer 541e, as described above.

The data writing unit 541f is a processing unit that writes the to-be-saved unit data and the parity data from the saved data buffer 541d and the parity buffer 541e, and writes the to-be-saved unit data and the parity data into the flash memory 141. The data writing unit 541f includes a CRC adding unit 541g and an AID adding unit 541h.

The CRC adding unit 541g generates a CRC for each set of the to-be-saved unit data read from the saved data buffer 541d, and generates a CRC for each set of the parity data read from the parity buffer 541e. The CRC adding unit 541g adds the generated CRCs to the to-be-saved unit data and the parity data.

The AID adding unit 541h adds AIDs to the to-be-saved unit data read from the saved data buffer 541d, and adds AIDs to the parity data read from the parity buffer 541e. The AID adding unit 541h acquires AIDs from the data save descriptor.

In this manner, the data writing unit 541f writes the to-be-saved unit data and parity data having the CRCs and AIDs added thereto into the flash memory 141.

Figure 7:
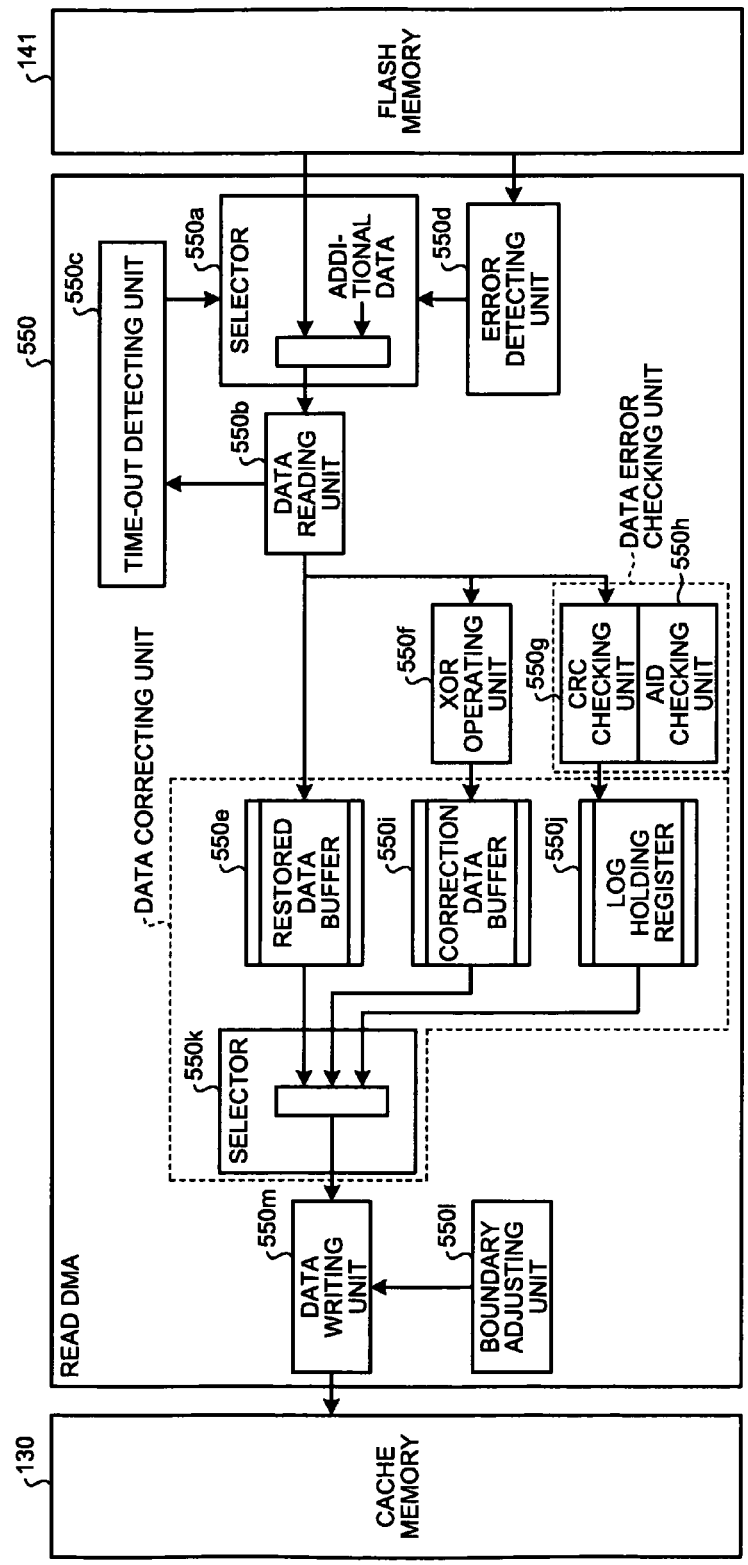
FIG. 7 is a diagram illustrating the structure of the read DMA illustrated in FIG. 5.

Next, the structure of the read DMA 550 is described. FIG. 7 is a diagram illustrating the structure of the read DMA 550 illustrated in FIG. 5. As illustrated in the diagram, the read DMA 550 includes a selector 550a, a data reading unit 550b, a time-out detecting unit 550c, an error detecting unit 550d, a restored data buffer 550e, an XOR operating unit 550f, a CRC checking unit 550g, an AID checking unit 550h, a correction data buffer 550i, a log holding register 550j, a selector 550k, a boundary adjusting unit 550l, and a data writing unit 550m.

The selector 550a is a selector circuit that selects and outputs only one input signal from two or more input signals. The selector 550a outputs the stripes stored in the flash memory 141 to the data reading unit 550b, or outputs additional data to the data reading unit 550b. Whether the selector 550a is to output stripes or additional data will be described later.

The data reading unit 550b reads stripes of small areas from the flash memory 141 via the selector 550a, and stores the read stripes into the restored data buffer 550e. At this point, the data reading unit 550b notifies the time-out detecting unit 550c of the time when the data reading operation has been started.

The time-out detecting unit 550c is a processing unit that monitors whether the data reading operation by the data reading unit 550b is completed within a predetermined period of time, based on the start time of the data reading operation received from the data reading unit 550b.

Specifically, the time-out detecting unit 550c detects a time-out that occurs with respect to the stripe being read by the data reading unit 550b, where the data reading operation by the data reading unit 550b is not completed even after the predetermined period of time has passed since the start time of the data reading operation. The time-out detecting unit 550c then issues a time-out detection notification containing the stripe number of the stripe from which the time-out has been detected, to the selector 550a.

The operation to be performed by the selector 550a having received the time-out detection notification is now described. Having received the time-out detection notification, the selector 550a suspends the operation to read the stripe indicated by the stripe number contained in the time-out detection notification, and outputs additional data of a size equivalent of the size of the portion of the stripe that could not be read, to the data reading unit 550b. After that, the selector 550a resumes the operation to read the next stripe.

The error detecting unit 550d is a processing unit that issues an ECC error notification to the selector 550a, when receiving a notification from the flash memory 141 notifying that an ECC check error has occurred.

The operation to be performed by the selector 550a having received the ECC error notification is now described. Having received the ECC error notification, the selector 550a suspends the operation to read the stripe being currently read, and outputs additional data of a size equivalent to the size of the portion of the stripe that could not be read, to the data reading unit 550b. After that, the selector 550a resumes the operation to read the next stripe.

The restored data buffer 550e is a memory device that temporarily stores data, and, as described above, the data reading unit 550b stores stripes or additional data having additional data added thereto, into the restored data buffer 550e.

The XOR operating unit 550f is a processing unit that generates correction data, using the stripes read out by the data reading unit 550b. Specifically, the XOR operating unit 550f generates correction data, using seven stripes having odd numbers as their stripe numbers. The XOR operating unit 550f also generates correction data, using seven stripes having even numbers as their stripe numbers. The XOR operating unit 550f stores the generated correction data into the correction data buffer 550i.

The CRC checking unit 550g is a processing unit that determines whether a data error exists in the stripes read out by the data reading unit 550b. Specifically, the CRC checking unit 550g determines whether a data error exists in each of the stripes, using the CRCs in the stripes read out by the data reading unit 550b. If there is a data error, or if an error is detected, the CRC checking unit 550g stores the stripe number of the stripe from which the error has been detected, into the log holding register 550j.

The AID checking unit 550h is a processing unit that determines whether there exist all the stripes read out by the data reading unit 550b. Specifically, the AID checking unit 550h determines whether all the stripes in the small areas exist, using the AIDs in the stripes read out by the data reading unit 550b. When determining that not all the stripes exist, or when having detected an error, the AID checking unit 550h stores the stripe number of the missing stripe into the log holding register 550j.

The correction data buffer 550i is a memory device that temporarily stores data, and, as described above, the XOR operating unit 550f stores the correction data into the correction data buffer 550i. The log holding register 550j is a memory device that temporarily stores data, and, as described above, the CRC checking unit 550g or the AID checking unit 550h stores the stripe number of the stripe from which an error has been detected, into the log holding register 550j.

The selector 550k is a selector circuit, and outputs the stripes stored in the restored data buffer 550e to the data writing unit 550*m*, or outputs the stripes having data errors corrected to the data writing unit 550*m*, based on the various kinds of data stored in the restored data buffer 550*e*, the correction data buffer 550*i*, and the log holding register 550*j*.

Specifically, as for the stripes not having their stripe numbers stored in the log holding register 550*j*, the selector 550*k* outputs the corresponding stripes stored in the restored data buffer 550*e* to the data writing unit 550*m*. As for the stripes having their stripe numbers stored in the log holding register 550*j* (those stripes will be hereinafter referred to as the "stripes having errors detected"), the selector 550*k* corrects the data errors in those stripes having errors generated, using the various kinds of data stored in the restored data buffer 550*e* and the correction data buffer 550*i*. The selector 550*k* then outputs the corrected stripes to the data writing unit 550*m*.

The boundary adjusting unit 550*l* is a processing unit that subtracts a boundary adjustment value from the stripes of the small areas received from the selector 550*k*. Specifically, the boundary adjusting unit 550*l* subtracts a boundary adjustment value of a size equivalent to the boundary adjustment value contained in the data restoration descriptor, from the stripes of the small areas.

The data writing unit 550*m* is a processing unit that writes the to-be-saved unit data contained in the stripes of the small areas from which the boundary adjustment value has been subtracted by the boundary adjusting unit 550*l*, into the cache memory 130. However, the data writing unit 550*m* does not write the parity data into the cache memory 130.

Figure 8:
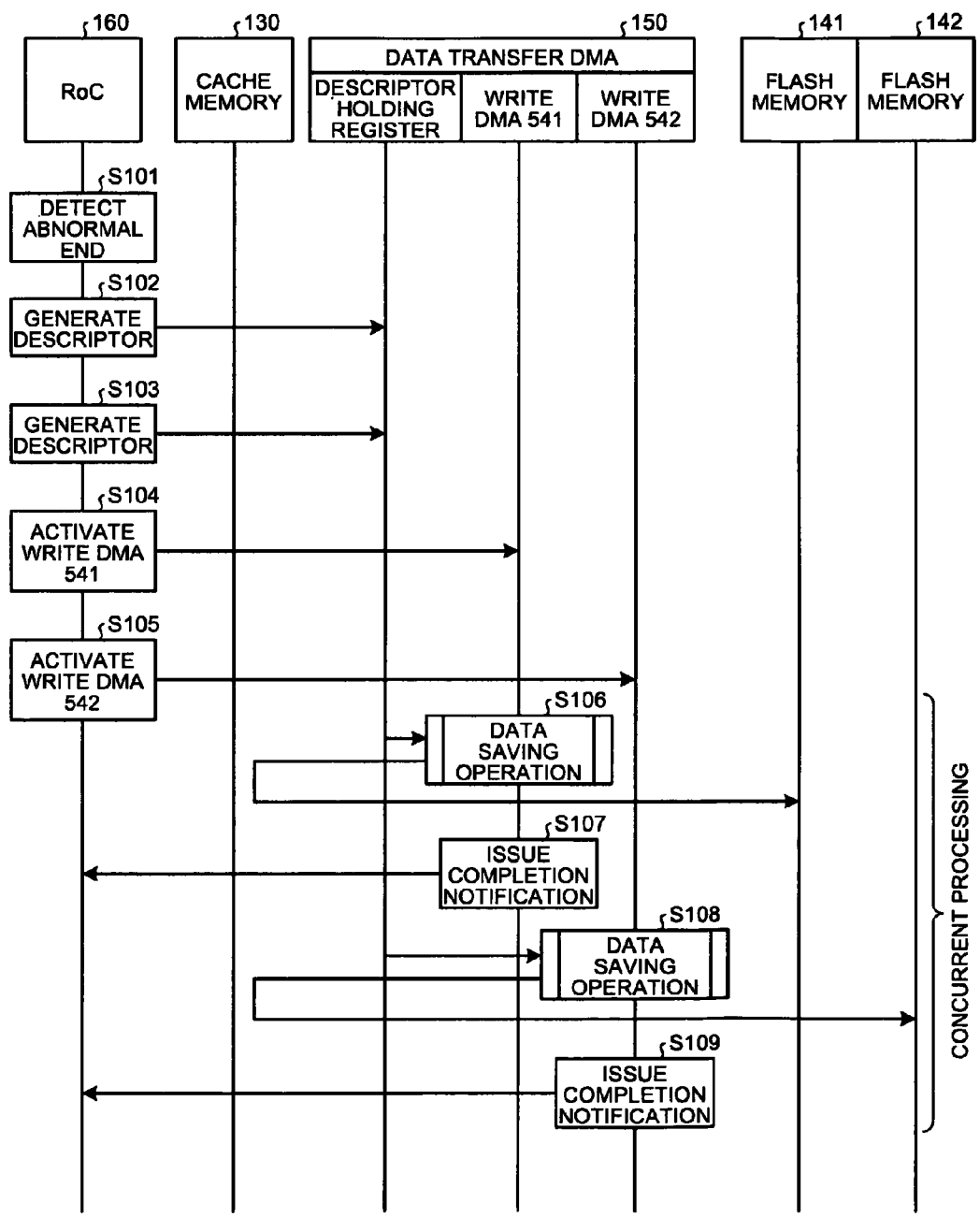
FIG. 8 is a sequence diagram illustrating the flow in the data saving operation to be performed by the storage device according to the first embodiment.

Next, the data saving operation to be performed by the storage device 1 according to the first embodiment is described. FIG. 8 is a sequence diagram illustrating the flow in the data saving operation to be performed by the storage device 1 according to the first embodiment.

As illustrated in the drawing, after determining that the storage device 1 has ended abnormally (step S101), the saved data area calculating unit 161 of the RoC 160 calculates various kinds of information necessary for generating a data save descriptor.

Based on the various kinds of information calculated by the saved data area calculating unit 161, the save instructing unit 162 generates a data save descriptor for causing the write DMA 541 to perform a data saving operation, and stores the data save descriptor into the descriptor holding register 530 (step S102).

For example, where the data D1 is stored in the cache memory 130 as in the example illustrated in FIG. 3A, the save instructing unit 162 generates a data save descriptor for causing the write DMA 541 to perform a data saving operation, with the data save descriptor containing the beginning address of the data D10, the size 28 [KB] of the data D10, the size 0 [KB] of the boundary adjustment value, the AIDs, and the likes.

Likewise, the save instructing unit 162 generates a data save descriptor for causing the write DMA 542 to perform a data saving operation, and stores it into the descriptor holding register 530 (step S103).

In the above described example case, the save instructing unit 162 generates a data save descriptor for causing the write DMA 542 to perform a data saving operation, with the data save descriptor containing the beginning address of the data D20, the size 25 [KB] of the data D20, the size 3 [KB] of the boundary adjustment value, the AIDs, and the likes.

After that, the save instructing unit 162 activates the write DMA 541 (step S104), and also activates the write DMA 542 (step S105). The save instructing unit 162 then causes the write DMA 541 and the write DMA 542 to perform the data saving operations concurrently.

The write DMA 541 activated by the save instructing unit 162 performs the data saving operation (step S106). When completing the data saving operation, the write DMA 541 notifies the RoC 160 that the data saving operation has been completed (step S107). Likewise, the write DMA 542 performs the data saving operation (step S108). When completing the data saving operation, the write DMA 542 notifies the RoC 160 that the data saving operation has been completed (step S109). The data saving operations are performed concurrently by the write DMAs 541 and 542.

In the above described flow in the data saving operation, the save instructing unit 162 generates a data save descriptor after the storage device 1 has ended abnormally. However, the save instructing unit 162 may generate a data save descriptor before the storage device 1 ends abnormally. For example, by acquiring the size of the to-be-saved data and the likes beforehand while the storage device 1 is running, it is possible to generate a data save descriptor before the storage device 1 ends abnormally.

Figure 9:
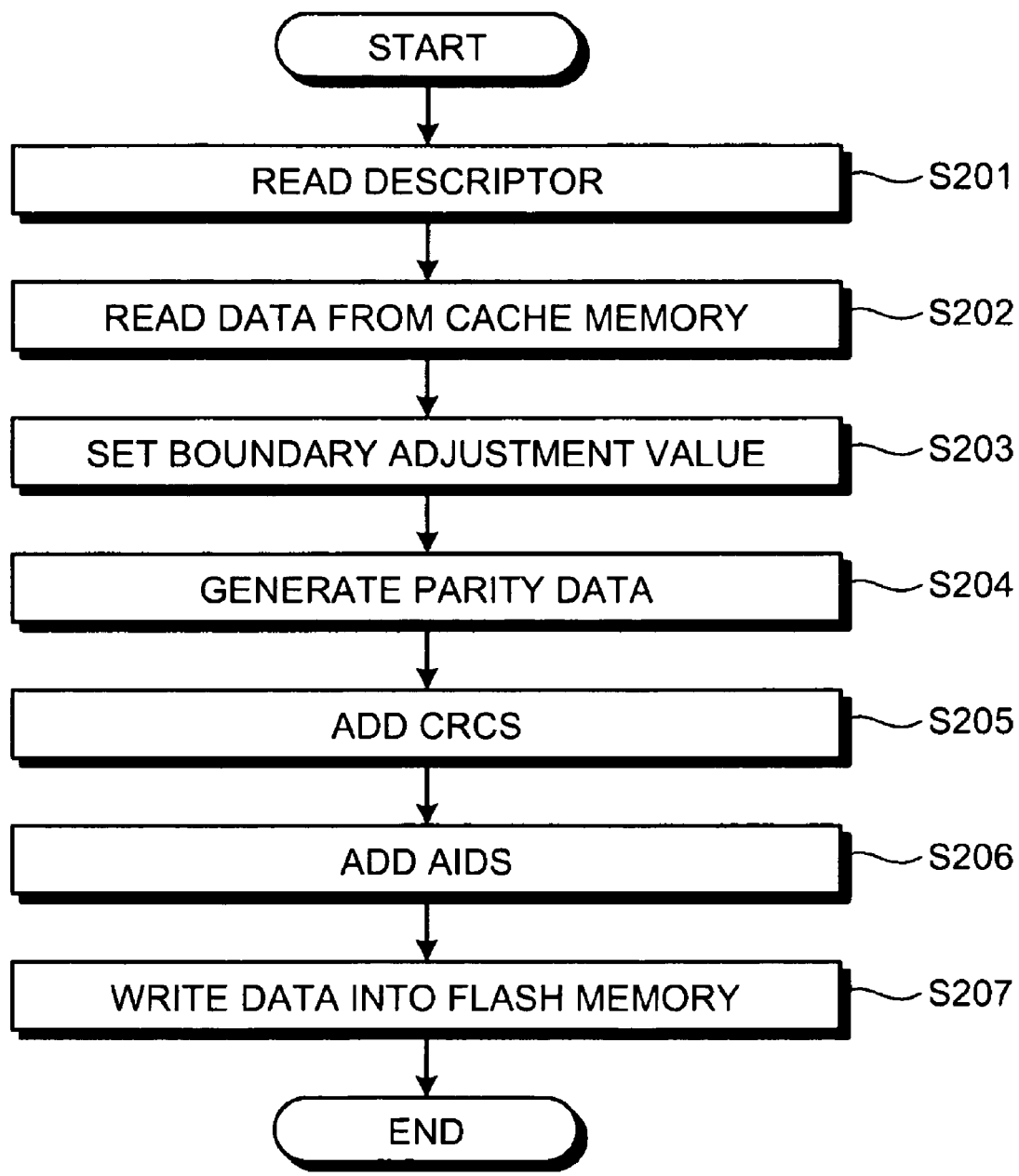
FIG. 9 is a flowchart illustrating the data saving operation procedures to be carried out by a write DMA.

Next, the data saving operations to be performed by the write DMAs 541 and 542 are described. FIG. 9 is a flowchart illustrating the data saving operation procedures to be carried out by the write DMAs 541 and 542. Since the data saving operation procedures to be carried out by the write DMAs 541 and 542 are the same, only the data saving operation procedures to be performed by the write DMA 541 are described herein.

As illustrated in the drawing, the write DMA 541 activated by the RoC 160 reads a data save descriptor from the descriptor holding register 530 (step S201). The data reading unit 541*a* of the write DMA 541 reads data of a predetermined size from the cache memory 130 (step S202). At this point, the data reading unit 541*a* reads the data of a size equivalent to the size of the to-be-saved data from the beginning address of the to-be-saved data contained in the data save descriptor.

The boundary adjusting unit 541*b* then adds a boundary adjustment value equivalent to the size of the boundary adjustment value contained in the data save descriptor (step S203).

The parity generating unit 541*c* then divides the to-be-saved data by a boundary size into sets of boundary data, and further divides the boundary data by 2 [KB], which is a size determined beforehand by the system. The parity generating unit 541*c* then generates parity data, using seven sets of to-be-saved unit data having odd numbers as their to-be-saved unit data numbers, and also generates parity data, using seven sets of to-be-saved unit data having even numbers as their to-be-saved unit data numbers (step S204).

The CRC adding unit 541*g* generates a CRC for each set of the to-be-saved unit data, and generates a CRC for each set of the parity data. The CRC adding unit 541*g* adds the generated CRCs to the to-be-saved unit data and the parity data (step S205). The AID adding unit 541*h* adds AIDs to the to-be-saved unit data and the parity data (step S206). The data writing unit 541*f* writes the to-be-saved unit data and parity data having the CRCs and AIDs added thereto into the flash memory 141 (step S207).

Figure 10:
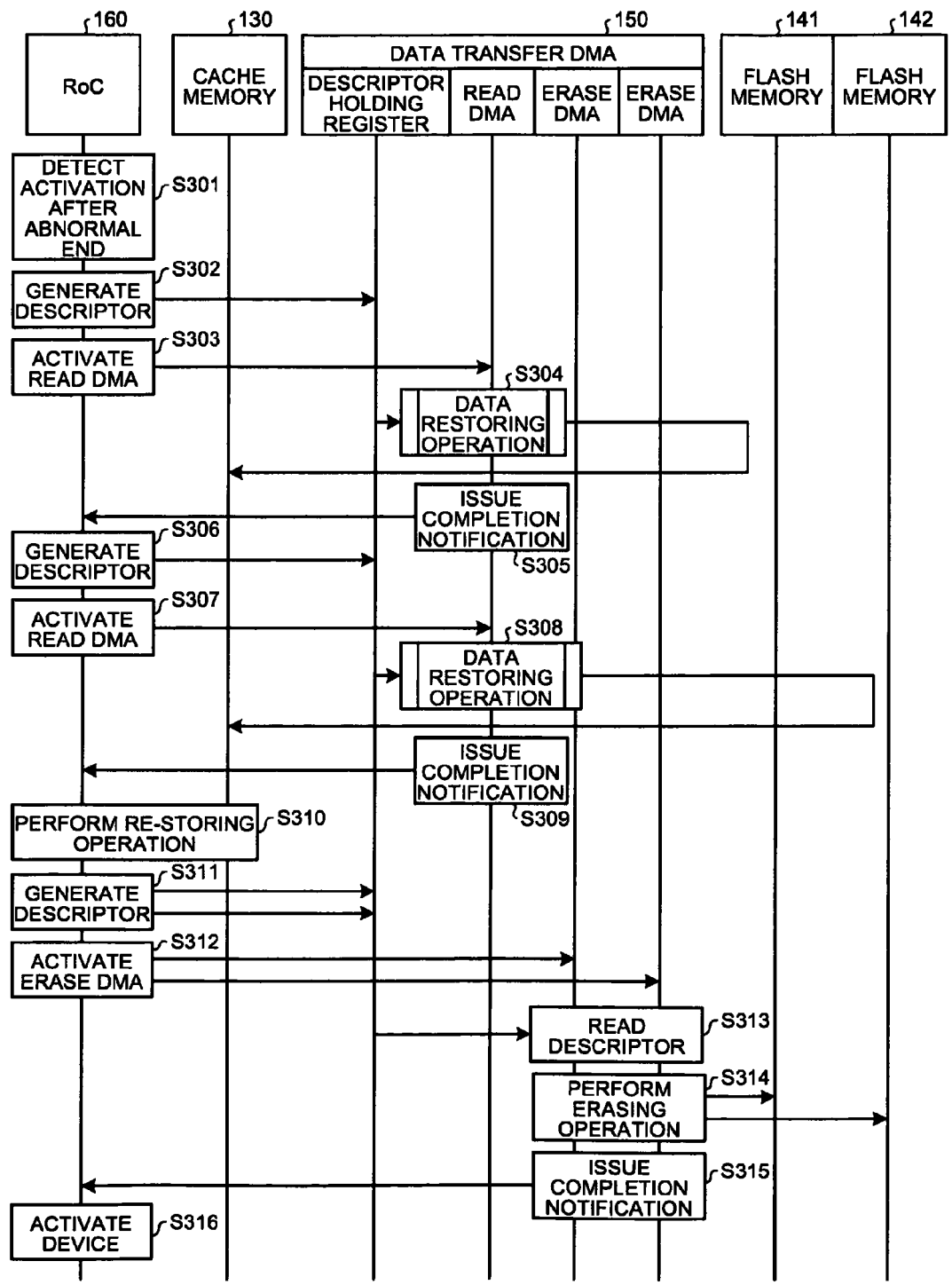
FIG. 10 is a sequence diagram illustrating the flow in the data restoring operation to be performed by the storage device according to the first embodiment.

Next, the data restoring operation to be performed by the storage device 1 according to the first embodiment is described. FIG. 10 is a sequence diagram illustrating the flow in the data restoring operation to be performed by the storage device 1 according to the first embodiment.

As illustrated in the diagram, if activation of the storage device 1 is detected after an abnormal end (step S301), the restoration instructing unit 163 of the RoC 160 generates a data restoration descriptor to the effect that the data stored in the flash memory 141 is to be restored to the cache memory 130, and stores it into the descriptor holding register 530 (step S302). After that, the restoration instructing unit 163 activates the read DMA 550 (step S303).

The read DMA 550 activated by the restoration instructing unit 163 performs a data restoring operation to restore the data stored in the flash memory 141 to the cache memory 130 (step S304). When completing the data restoring operation, the read DMA 550 notifies the RoC 160 that the data restoring operation has been completed (step S305).

The restoration instructing unit 163 then generates a data restoration descriptor to the effect that the data stored in the flash memory 142 is to be restored to the cache memory 130, and stores it into the descriptor holding register 530 (step S306). After that, the restoration instructing unit 163 activates the read DMA 550 (step S307).

The read DMA 550 activated by the restoration instructing unit 163 performs a data restoring operation to restore the data stored in the flash memory 142 to the cache memory 130 (step S308). When completing the data restoring operation, the read DMA 550 notifies the RoC 160 that the data restoring operation has been completed (step S309).

The RoC 160 then performs a re-storing operation (flashback) to store the data restored in the cache memory 130 into the HDD 11 (step S310). By doing so, all the data in the cache memory 130 not written in the HDD 11 is lost.

The restoration instructing unit 163 then generates an erase descriptor, and stores it into the data transfer DMA 150 (step S311). The restoration instructing unit 163 activates the erase DMAs 561 and 562 (step S312), and causes the erase DMAs 561 and 562 to erase the data stored in the flash memories 141 and 142.

The erase DMAs 561 and 562 activated by the restoration instructing unit 163 read an erase descriptor from the descriptor holding register 530 (step S313), and perform erasing operations (step S314). When completing the erasing operations, the erase DMAs 561 and 562 notifies the RoC 160 that the erasing operations have been completed (step S315). Receiving the notification that the erasing operations have been completed, the RoC 160 activates the storage device 1 (step S316).

Next, the data restoring operation to be performed by the read DMA 550 is described. FIG. 11 is a flowchart illustrating the data restoring operation procedures to be carried out by the read DMA 550. As illustrated in the flowchart, the read DMA 550 activated by the RoC 160 reads a data restoration descriptor from the descriptor holding register 530 (step S401).

The data reading unit 550b of the read DMA 550 reads stripes of small areas from the flash memory 141 via the selector 550a (step S402). If the data reading operation by the data reading unit 550b is not completed within a predetermined period of time (No in step S403), the time-out detecting unit 550c determines that a time-out has occurred in the stripe being read by the data reading unit 550b. The time-out detecting unit 550c then issues a time-out detection notification to the selector 550a.

Receiving the time-out detection notification, the selector 550a suspends the operation to read the stripe indicated by the stripe number contained in the time-out detection notification, and outputs additional data of a size equivalent to the size of the portion of the stripe that could not be read out, to the data reading unit 550b (step S404). In this manner, the data reading unit 550b reads the stripes of small areas from the flash memory 141.

The XOR operating unit 550f generates correction data, using the stripes read out by the data reading unit 550b (step S405). The CRC checking unit 550g determines whether a data error exists in the stripes read out by the data reading unit 550b, and the AID checking unit 550h determines whether there exist all the stripes read out by the data reading unit 550b (step S406).

If an error is detected by the CRC checking unit 550g or the AID checking unit (Yes in step S407), the selector 550k corrects the data error in the stripe from which the error has been detected, based on the stripes read out by the data reading unit 550b and the correction data generated by the XOR operating unit 550f (step S408).

The boundary adjusting unit 550l then subtracts a boundary adjustment value equivalent to the size of the boundary adjustment value contained in the data restoration descriptor, from the stripes of the small areas read out by the data reading unit 550b (step S409).

The data writing unit 550m writes the to-be-saved unit data contained in the stripes of the small areas from which the boundary adjustment value has been subtracted by the boundary adjusting unit 550l, into the cache memory 130 (step S410). At this point, the data writing unit 550m does not write the parity data into the cache memory 130.

If not all the data stored in the flash memory 141 have been read out (No in step S411), the read DMA 550 repeats the above described procedures (steps S401 through S410) until reading all the data from the flash memory 141.

As described above, during the data saving operation, the storage device 1 according to the first embodiment generates the parity data of the to-be-saved data, and writes the to-be-saved data and parity data having CRCs and AIDs added thereto into the flash memory 141 or 142. During the data restoring operation, if the operation to read data from the flash memory 141 or 142 is not completed within a predetermined period of time, the data reading operation is suspended, and additional data is set. Data that is obtained by correcting a data error with the use of the parity data is written into the cache memory 130. Accordingly, even if there is not a data read response from the flash memory 141 or 142, the data saved in the flash memory 141 or 142 can be restored to the cache memory 130.

In the above described first embodiment, during the data saving operation, the write DMAs 541 and 542 each generate one set of parity data for seven sets of to-be-saved unit data. However, the ratio between the number of sets of to-be-saved unit data and the number of sets of parity data is not limited to that. For example, the write DMAs 541 and 542 may each generate one set of parity data for two sets of to-be-saved data, or may each generate one set of parity data for ten sets of to-be-saved unit data.

Also, in the above described first embodiment, the write DMAs 541 and 542 generate the parity data with the use of the to-be-saved unit data having odd numbers as their to-be-saved unit data numbers, and generate the parity data with the use of the to-be-saved unit data having even numbers as their to-be-saved unit data numbers. However, the write DMAs 541 and 542 may generate the parity data with the use of a predetermined number of sets of to-be-saved unit data, regardless of to-be-saved unit data numbers.

[b] Second Embodiment

Although boundary processing is performed to add a boundary adjustment value to the boundary data having a data size that is smaller than the boundary size in the above described first embodiment, the boundary processing may not be performed. In a second embodiment, boundary processing is not performed even if the data read from the cache memory 130 cannot be divided by the boundary size.

First, a data saving operation to be performed by a storage device 2 according to the second embodiment is outlined. Since the fundamental structure of the storage device 2 according to the second embodiment is the same as the fundamental structure of the storage device 1 illustrated in FIG. 1, explanation of it is omitted herein.

Figure 12A:
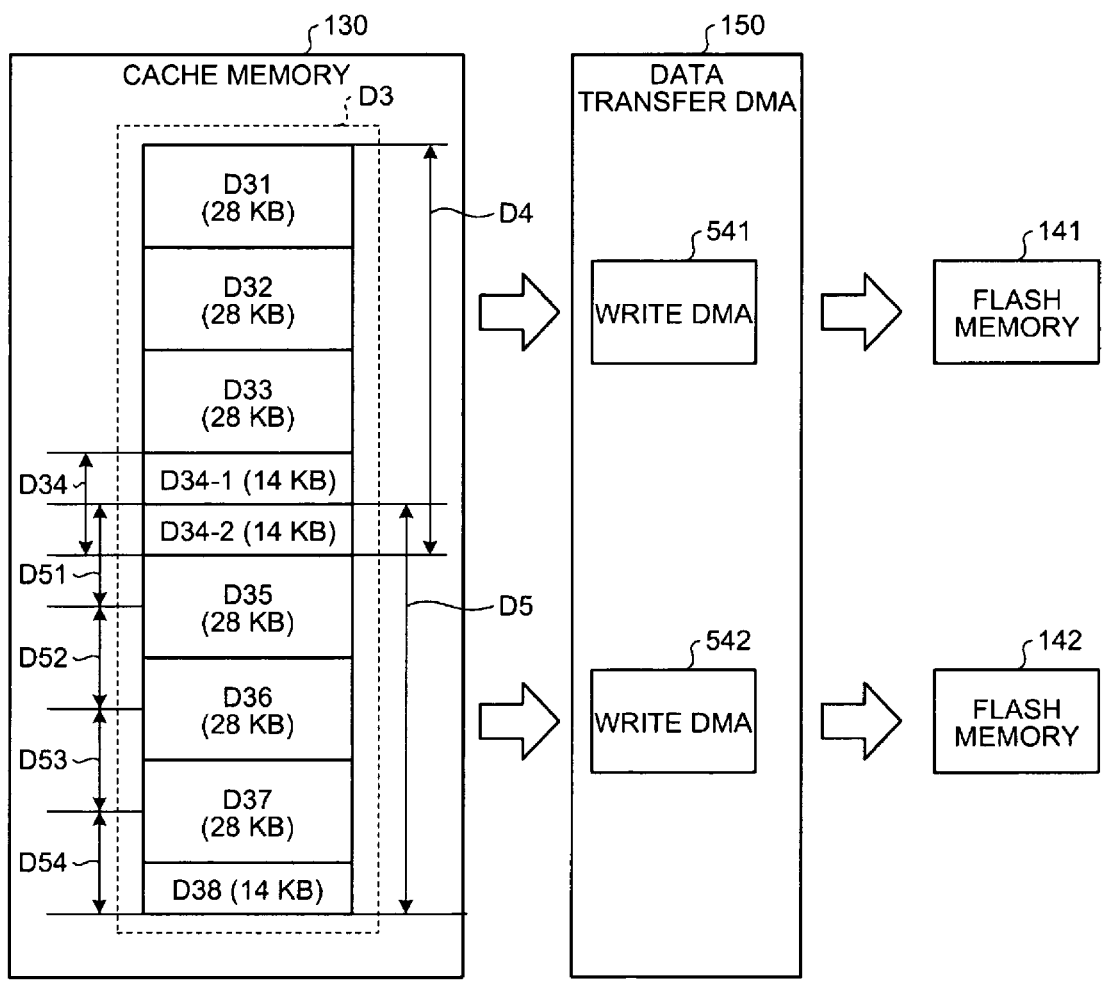
FIG. 12A is a diagram for outlining a data saving operation to be performed by a storage device according to a second embodiment.

FIG. 12A is a drawing for outlining the data saving operation to be performed by the storage device 2 according to the second embodiment. As illustrated in the drawing, data D3 of 210 [KB] is stored in the cache memory 130. If the storage device 2 ends abnormally in such a situation, the data D3 is divided by the boundary size, which is 28 [KB], to form data D31 through D38.

Here, a RoC (a RoC 260) of the storage device 2 according to the second embodiment instructs the write DMA 541 to perform a data saving operation on data D4 (the data D31 through D34) of the data D3 stored in the cache memory 130.

Further, the RoC 260 instructs the write DMA 542 to perform a data saving operation on data D5 (data D34-2 and the data D35 through D38) of the data D3 stored in the cache memory 130.

Specifically, the RoC 260 instructs the write DMA 541 to perform a data saving operation on the four sets of boundary data (the data D31, D32, D33, and D34 illustrated in the drawing) counted from the beginning address that is the location of the beginning of the data D3 stored in the cache memory 130. Also, the RoC 260 instructs the write DMA 542 to perform a data saving operation on the four sets of boundary data (the data D54, D53, D52, and D51 illustrated in the drawing) counted toward the beginning address from the final address that is the location of the last portion of the data D3 stored in the cache memory 130.

Receiving such an instruction, the write DMA 541 can divide the data D4 by the boundary size, which is 28 [KB], to form the data D31 through D34. The write DMA 542 can also divide the data D5 by the boundary size, which is 28 [KB], to form the data D51 through D54. In this manner, the storage device 2 according to the second embodiment can perform the data saving operation, without performing the boundary processing.

Figure 12B:
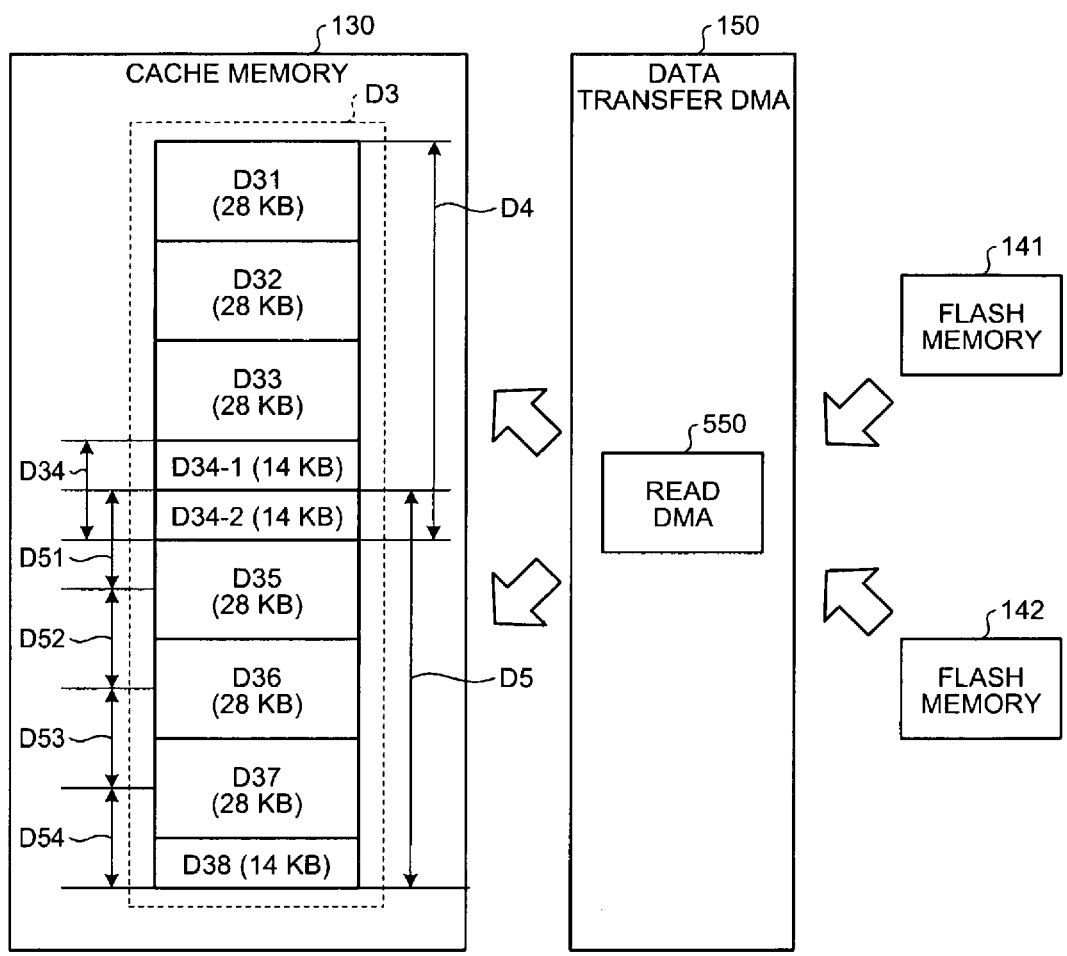
FIG. 12B is a diagram for outlining a data restoring operation to be performed by the storage device according to the second embodiment.

Next, a data restoring operation to be performed by the storage device 2 according to the second embodiment is outlined. FIG. 12B is a drawing for outlining the data restoring operation to be performed by the storage device 2 according to the second embodiment. The data saved by the write DMA 541 and the write DMA 542 illustrated in FIG. 12A are stored in the flash memories 141 and 142 illustrated in FIG. 12B.

When the storage device 2 starts after an abnormal end, the read DMA 550 performs various kinds of checks (a CRC check and the likes) while reading the data D31 from the flash memory 141. The read DMA 550 then writes the data into the cache memory 130. The read DMA 550 performs the same operation on the data D32 through D34, to restore the data D4 to the cache memory 130.

The read DMA 550 then, performs various kinds of checks (a CRC check and the likes) while reading the data D51 from the flash memory 142. The read DMA 550 then writes the data into the cache memory 130. Since the data D34-2 read from the flash memory 141 is already written in the cache memory 130, the read DMA 550 overwrites the portion of the data D34-2 to write the data D51.

The read DMA 550 sequentially reads the data D52 through D54 from the flash memory 142, and restores the data D5 to the cache memory 130. As the read DMA 550 writes all the data stored in the flash memories 141 and 142 into the cache memory 130, the data D3 is restored to the cache memory 130.

As described above, the storage device 2 according to the second embodiment causes the write DMA 541 of the two write DMAs 541 and 542 to perform a data saving operation on a predetermined number of sets of boundary data counted from the beginning address that is the location of the beginning of the to-be-saved data in the cache memory 130. The storage device 2 causes the other write DMA 542 to perform a data saving operation on a predetermined number of sets of boundary data counted toward the beginning address from the final address that is the location of the last portion of the to-be-saved data stored in the cache memory 130. Accordingly, for the DMAs 541 and 542, the data to be saved into the flash memory 141 or 142 is divisible by the boundary data. As a result, the DMAs 541 and 542 can perform data saving operations, without performing the boundary processing.

Figure 13:
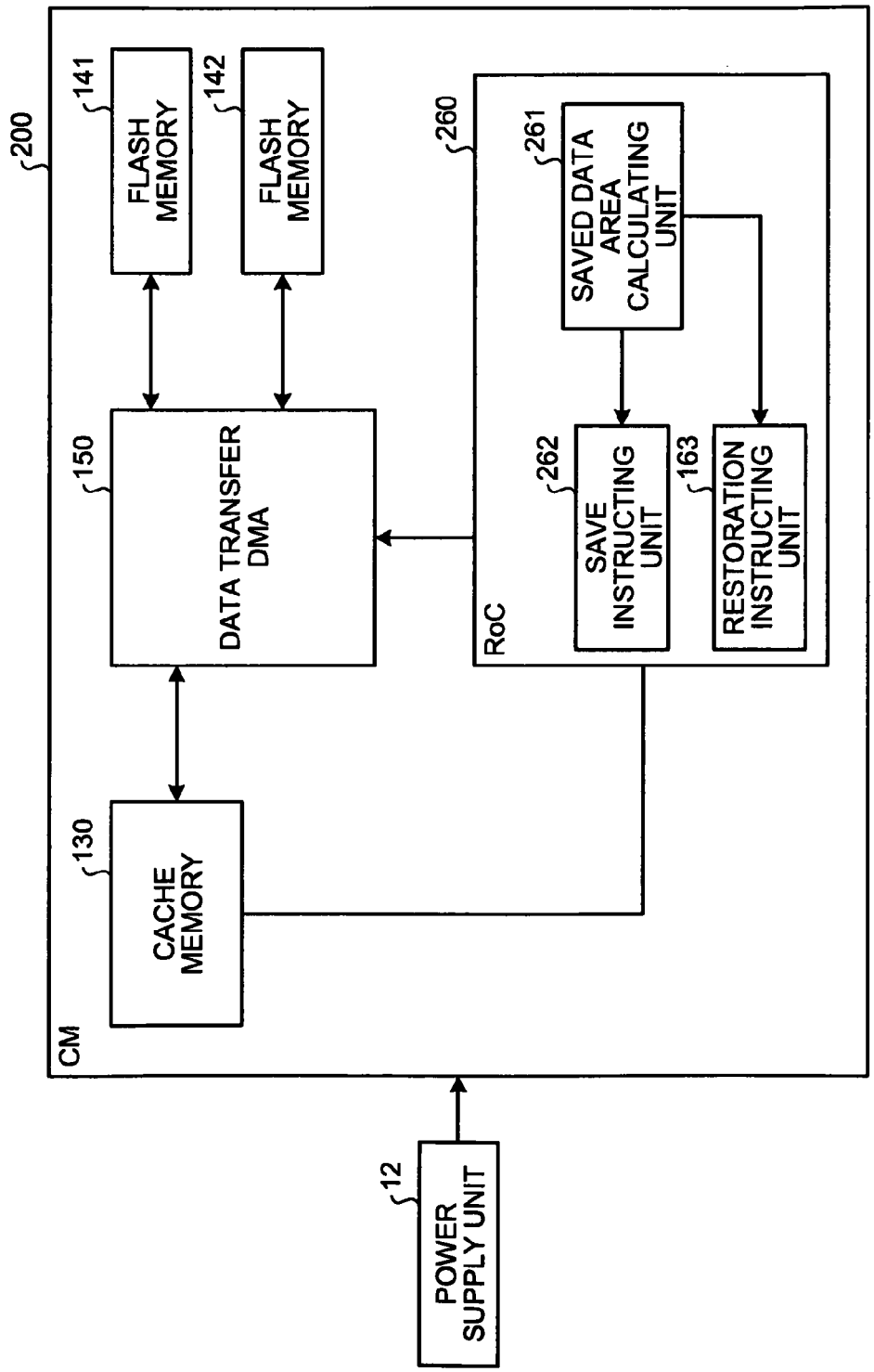
FIG. 13 is a diagram illustrating the structure of a CM included in the storage device according to the second embodiment.

Next, the structure of a CM 200 included in the storage device 2 according to the second embodiment is described. FIG. 13 is a diagram illustrating the structure of the CM 200 included in the storage device 2 according to the second embodiment. The components having the same functions as the components illustrated in FIG. 4 are denoted by the same reference numerals as those used in FIG. 4, and explanation of them is omitted herein.

When the storage device 2 ends abnormally, a saved data area calculating unit 261 illustrated in the drawing first calculates the start address BA1 and size DS1 of the data to be saved by the write DMA 541, and then calculates the start address BA2 and size DS2 of the data to be saved by the write DMA 542, based on the size of the to-be-saved data stored in the cache memory 130 and the likes.

In the following, the saved data area calculating operation to be performed by the saved data area calculating unit 261 is described in greater detail through the example illustrated in FIG. 12A. First, when the storage device 2 ends abnormally, the saved data area calculating unit 261 acquires the beginning address and the final address indicating the location of storage of the to-be-saved data in the cache memory 130. The saved data area calculating unit 261 sets the acquired beginning address as the start address BA1 of the data to be saved by the write DMA 541.

The saved data area calculating unit 261 then determines the size "X" by dividing the size of the to-be-saved data by 2. In the example illustrated in FIG. 12A, the size of the to-be-saved data is 210 [KB], the saved data area calculating unit 261 obtains 105 [KB] as the size X by dividing 210 [KB] by 2.

The saved data area calculating unit 261 then multiplies the smallest value of the integer N that satisfies the expression (1), "28 [KB]×N>size X [KB]", by 28 [KB], and sets the obtained value as the size DS1 of the data to be saved by the write DMA 541. In the above example, since the size X is 105 [KB] and the smallest value N that satisfies the expression (1) is "4", the saved data area calculating unit 261 sets 112 [KB], obtained by multiplying 4 by 28 [KB], as the size DS1 of the data to be saved by the write DMA 541.

The saved data area calculating unit 261 then obtains the value "Y" by adding the size DS1 of the data to be saved by the write DMA 541 to the beginning address of the to-be-saved data. The value Y is equivalent to the final address of the data to be saved by the write DMA 541. The saved data area calculating unit 261 then determines the value "Z" by subtracting Y from the final address of the to-be-saved data. The value Z is equivalent to the size obtained by subtracting the size DS1 of the data to be saved by the write DMA 541 from the size of the to-be-saved data.

Specifically, since the size of the to-be-saved data is 210 [KB] and the size DS1 is 112 [KB] in the above example, the saved data area calculating unit 261 obtains 98 [KB] as the size Z by subtracting 112 [KB] from 210 [KB].

The saved data area calculating unit 261 then multiplies the smallest value of the integer N that satisfies the expression (2), "28 [KB]×N>size Z [KB]", by 28 [KB], and sets the obtained value as the size DS2 of the data to be saved by the write DMA 542. In the above example, since the size Z is 98 [KB] and the smallest value N that satisfies the expression (2) is "4", the saved data area calculating unit 261 sets 112 [KB], obtained by multiplying 4 by 28 [KB], as the size DS2 of the data to be saved by the write DMA 542.

The saved data area calculating unit 261 then subtracts the size DS2 of the data to be saved by the write DMA 542 from the final address of the to-be-saved data, and sets the obtained value as the beginning address BA2 of the data to be saved by the write DMA 542.

In this manner, the saved data area calculating unit 261 calculates the start address BA1 and size DS1 of the data to be saved by the write DMA 541, and the start address BA2 and size DS2 of the data to be saved by the write DMA 542.

A save instructing unit 262 illustrated in FIG. 13 generates a data save descriptor, and transmits it to the data transfer DMA 150. By doing so, the save instructing unit 262 instructs the write DMAs 541 and 542 to perform data saving operations.

Specifically, the save instructing unit 262 generates a data save descriptor containing the above mentioned start address BA1 and size DS1, and instructs the write DMA 541 to perform a data saving operation based on the data save descriptor. Also, the save instructing unit 262 generates a data save descriptor containing the above mentioned start address BA2 and size DS2, and instructs the write DMA 542 to perform a data saving operation based on the data save descriptor. Each data save descriptor generated by the save instructing unit 262 does not contain the size of a boundary adjustment value.

Figure 14:
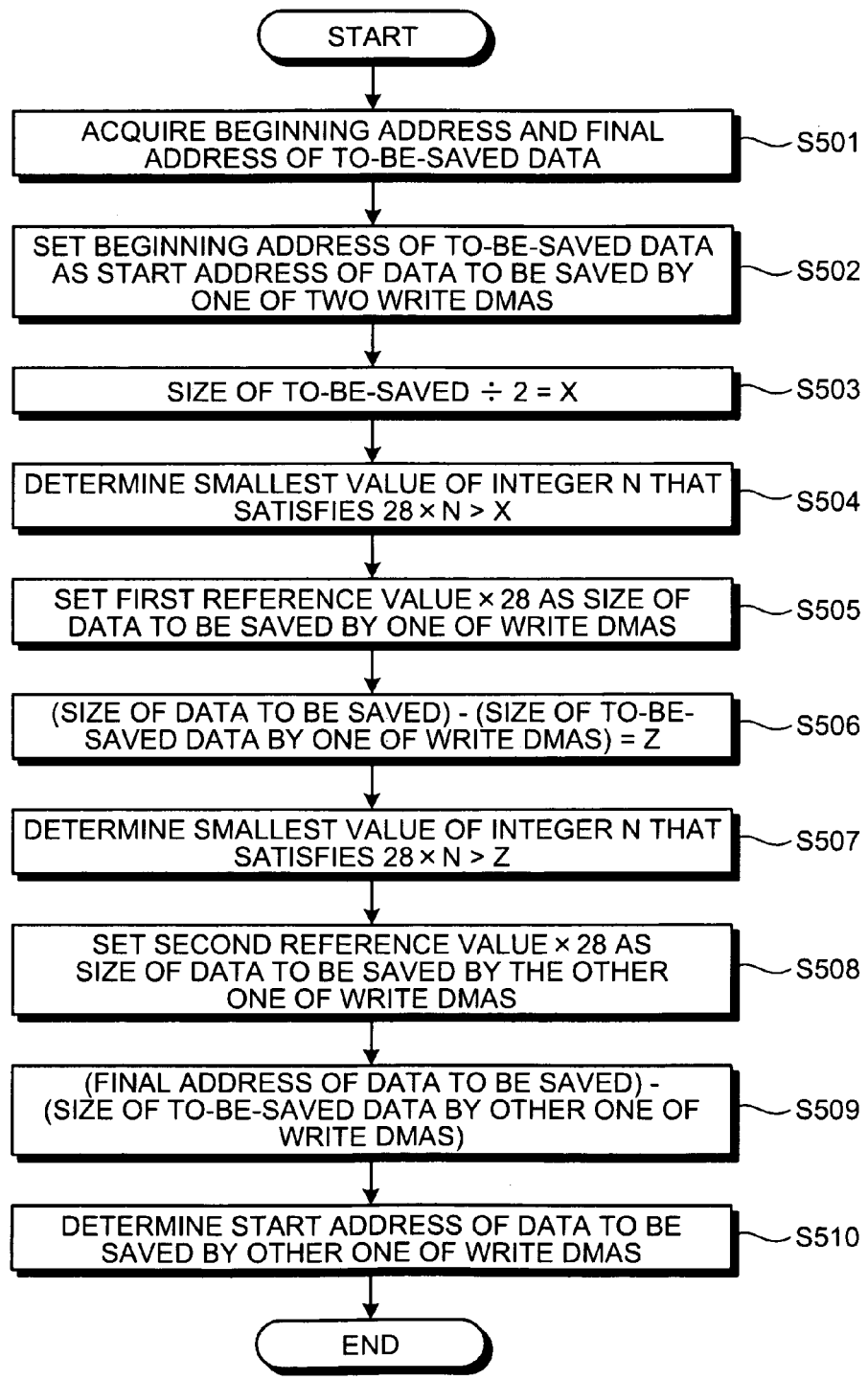
FIG. 14 is a flowchart illustrating the saved data area calculating operation procedures to be carried out by the saved data area calculating unit illustrated in FIG. 13.

Next, the saved data area calculating operation to be performed by the saved data area calculating unit 261 illustrated in FIG. 13 is described. FIG. 14 is a flowchart illustrating the saved data area calculating operation procedures to be carried out by the saved data area calculating unit 261 illustrated in FIG. 13.

As illustrated in FIG. 14, the saved data area calculating unit 261 acquires the beginning address and final address indicating the location of storage of the to-be-saved data in the cache memory 130 (step S501).

The saved data area calculating unit 261 then sets the acquired beginning address as the start address of the data to be saved by the write DMA 541 (step S502). The saved data area calculating unit 261 then determines the size X by dividing the size of the to-be-saved data by 2 (step S503).

The saved data area calculating unit 261 then determines the smallest value of the integer N that satisfies the expression (1), "28 [KB]×N>size X [KB]" (step S504). Hereinafter, the smallest value N obtained here will be referred to as the "first reference value". The saved data area calculating unit 261 then sets the value obtained by multiplying the first reference value by 28 [KB] as the size of the data to be saved by the write DMA 541 (step S505).

The saved data area calculating unit 261 then determines the size Z by subtracting the size of the data to be saved by the write DMA 541 from the size of the to-be-saved data (step S506). The saved data area calculating unit 261 then determines the smallest value of the integer N that satisfies the expression (2), "28 [KB]×N>size Z [KB]" (step S507). Hereinafter, the smallest value N obtained here will be referred to as the "second reference value". The saved data area calculating unit 261 then sets the value obtained by multiplying the second reference value by 28 [KB] as the size of the data to be saved by the write DMA 542 (step S508).

The saved data area calculating unit 261 then obtains a value by subtracting the size of the data to be saved by the write DMA 542 from the final address of the to-be-saved data (step S509), and sets the obtained value as the beginning address of the data to be saved by the write DMA 542 (step S510).

As described above, in the storage device 2 according to the second embodiment, the saved data area calculating unit 261 is designed to determine the start address and size of the data to be saved by the write DMAs 541 and 542. Accordingly, for the DMAs 541 and 542, the data to be saved into the flash memory 141 or 142 is divisible by the boundary data. As a result, even if there is not a data read response from the flash memory 141 or 142, the data saved in the flash memory 141 or 142 can be restored to the cache memory 130, without the boundary processing being performed.

Since the boundary processing is unnecessary in the storage device 2 according to the second embodiment, the saved data area calculating unit 261 does not need to calculate the size of a boundary adjustment value. As a result, the processing load on the saved data area calculating unit 261 can be reduced, and data saving operations can be performed at higher speeds. Accordingly, at the time of an abnormal end, a data saving operation can be performed on a large volume of data within a short period of time during which power is supplied from the power supply unit 12.

Since the boundary processing is unnecessary in the storage device 2 according to the second embodiment, the circuits for performing the boundary processing can be deleted from the write DMAs 541 and 542 and the read DMA 550, and the write DMAs 541 and 542 and the read DMA 550 can be made smaller in size. For example, in the storage device 2 according to the second embodiment, the boundary adjusting unit 541*b* can be deleted from the write DMA 541 illustrated in FIG. 6, and the boundary adjusting unit 550*f* can be deleted from the read DMA 550 illustrated in FIG. 7. As a result, the costs on the write DMAs 541 and 542 and the read DMA 550 can be lowered.

In the above described second embodiment, the saved data area calculating unit 261 calculates the start address and size of the data to be saved by the write DMAs 541 and 542, on the assumption that the storage device 2 has the two write DMAs 541 and 542. However, in a storage device having three or more write DMAs, the saved data area calculating unit 261 may calculate the start address and size of the data to be saved by each write DMA, so that the boundary processing becomes unnecessary. For example, where the storage device has four write DMAs, the saved data area calculating unit 261 calculates the start address and size of the data to be saved by the fourth write DMA, so that the fourth write DMA performs a data saving operation on a predetermined number of sets of boundary data counted toward the beginning address from the final address of the to-be-saved data.

In the above described first and second embodiments, the boundary size is 28 [KB], the size by which the boundary data is divided is 2 [KB], the number of pages in each area is 1024, and the number of pages in each small area is 16. However, those set values are not limited to the above examples. For example, the boundary size may be 56 [KB], the size by which the boundary data is divided may be 4 [KB], the number of pages in each area may be 2048, and the number pages in each small area may be 32.

In the above described first and second embodiments, OneNAND flash memories are used as storage areas into which data is saved at the time of an abnormal end. However, the storage areas into which data is to be saved at the time of an abnormal end may be nonvolatile memories other than OneNAND flash memories.

The operation procedures, control procedures, specific names, and information including various kinds of data and parameters that are described in the above description and illustrated in the drawings may be arbitrarily changed, unless otherwise specified. The components of each device illustrated in the drawings are merely conceptual functions, and do not necessarily have physical structures as illustrated in the drawings. In other words, specific embodiments of separation and integration of the respective devices are not limited to those illustrated in the drawings, and all of or part of each device may be functionally or physically divided or integrated in arbitrary units, depending on the various kinds of loads and the usage status. Further, each processing function of each device is entirely or partially realized by a Central Processing unit (CPU) or a program to be analyzed and executed by the CPU, or may be entirely or partially realized as hardware with hard-wired logics.

By an aspect of an embodiment of the storage device, the data saved in a nonvolatile memory can be advantageously restored to a cache memory, even if there is not a data read response from the nonvolatile memory.

It should be noted that the components of the storage device disclosed in this application and any combinations of representations and components applied to methods, devices, systems, computer programs, recording media, data structures, and the likes are valid as other embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device comprising:
    a data transfer unit configured to store to-be-transferred data into a nonvolatile memory, when an abnormal end occurs, the to-be-transferred data including to-be-saved data stored in a cache memory and parity data for correcting a data error in the to-be-saved data;
    a data reading unit configured to read stripes from the nonvolatile memory when power is supplied to the storage device after an abnormal end, the stripes being formed by dividing the to-be-transferred data by a predetermined stripe size;
    an additional data adding unit configured to, when the data reading unit does not finish reading one of the stripes within a predetermined period of time, add additional data to the one of the stripes until a size of the one of the stripes becomes equal to the stripe size;
    a data error checking unit configured to detect whether a data error exists in the stripes read out by the data reading unit;
    a data correcting unit configured to, when the data error checking unit detects the data error, correct the detected data error, based on the stripes related to an error data stripe to which the detected data error belongs; and
    a data writing unit configured to write into the cache memory data contained in the stripes not including the data error detected by the data error checking unit, and write into the cache memory data contained in the corrected error data stripe including the data error corrected by the data correcting unit.

2. The storage device according to claim 1, further comprising:
    a first data saving unit configured to store data of a predetermined size into the nonvolatile memory from a beginning address indicating a location of a beginning of storage of the to-be-saved data in the cache memory, when the storage device ends abnormally; and
    a second data saving unit configured to store data of a predetermined size into the nonvolatile memory from a final address indicating a location of an end of storage of the to-be-saved data in the cache memory, when the storage device ends abnormally.

3. The storage device according to claim 2, further comprising:
    a saved data area calculating unit configured to, when the storage device ends abnormally,
        determine the beginning address of the to-be-saved data as a first start address to be first read from the cache memory by the first data saving unit,
        determine a first data save size to be read from the cache memory by the first data saving unit by multiplying the smallest value of an integer N by a predetermined boundary size, with a value obtained by multiplying the boundary size by the integer N being larger than a half of the to-be-saved data,
        determine a second data save size to be read from the cache memory by the second data saving unit by multiplying the smallest value of an integer M by the boundary size, with a value obtained by multiplying the boundary size by the integer M being larger than a value obtained by subtracting the first data save size from the size of the to-be-saved data, and,
        determine a second start address to be first read from the cache memory by the second data saving unit, based on the final address and the second data save size, wherein
    the first data saving unit stores, into the nonvolatile memory, data of a size equivalent to the first data save size calculated by the saved data area calculating unit, the data being from the first start address calculated by the saved data area calculating unit in the to-be-saved data, and
    the second data saving unit stores, into the nonvolatile memory, data of a size equivalent to the second data save size calculated by the saved data area calculating unit, the data being from the second start address calculated by the saved data area calculating unit in the to-be-saved data.

4. The storage device according to claim 1, wherein the data error checking unit determines whether a data error exists in the stripes, based on an error detection code or Cyclic Redundancy Checks (CRCs) related to the stripes.

5. The storage device according to claim 1, wherein the data error checking unit determines whether all the stripes exist, based on stripe identification numbers added to the stripes, the stripe identification numbers being for identifying the stripes.

6. A data transfer integrated circuit for storing to-be-transferred data into a nonvolatile memory, the to-be-transferred data including to-be-saved data stored in a cache memory and parity data for correcting a data error in the to-be-saved data, the data transfer integrated circuit comprising:
- a data reading unit configured to read stripes from the nonvolatile memory, the stripes being formed by dividing the to-be-transferred data by a predetermined stripe size;
- an additional data adding unit configured to, when the data reading unit does not finish reading one of the stripes within a predetermined period of time, add additional data to the one of the stripes until a size of the one of the stripes becomes equal to the stripe size;
- a data error checking unit configured to detect whether a data error exists in the stripes read out by the data reading unit;
- a data correcting unit configured to, when the data error checking unit detects the data error, correct the detected data error, based on the stripes related to an error data stripe to which the detected data error belongs; and
- a data writing unit configured to write into the cache memory data contained in the stripes not including the data error detected by the data error checking unit, and write into the cache memory data contained in the corrected error data stripe including the data error corrected by the data correcting unit.

7. The data transfer integrated circuit according to claim 6, further comprising:
- a first data saving unit configured to store data of a predetermined size into the nonvolatile memory from a beginning address indicating a location of a beginning of storage of the to-be-saved data in the cache memory; and
- a second data saving unit configured to store data of a predetermined size into the nonvolatile memory from a final address indicating a location of an end of storage of the to-be-saved data in the cache memory.

8. A storage control method for controlling a storage device including a data transfer unit configured to store to-be-transferred data into a nonvolatile memory when an abnormal end occurs, the to-be-transferred data including to-be-saved data stored in a cache memory and parity data for correcting a data error in the to-be-saved data, the storage control method comprising:
- reading stripes from the nonvolatile memory when power is supplied after an abnormal end, the stripes being formed by dividing the to-be-transferred data by a predetermined stripe size;
- adding, when one of the stripes is not read within a predetermined period of time at the reading, additional data to the one of the stripes until a size of the one of the stripes becomes equal to the stripe size;
- checking whether a data error exists in the stripes read out at the reading;
- correcting, when the data error is detected at the checking, the detected data error, based on the stripes related to an error data stripe to which the detected data error belongs; and
- writing into the cache memory data contained in the stripes not including the data error detected at the checking, and writing into the cache memory data contained in the corrected error data stripe including the data error corrected at the correcting.

9. The storage control method according to claim 8, further comprising:
- storing data of a predetermined size into the nonvolatile memory from a beginning address indicating a location of a beginning of storage of the to-be-saved data in the cache memory, when an abnormal end occurs; and
- storing data of a predetermined size into the nonvolatile memory from a final address indicating a location of an end of storage of the to-be-saved data in the cache memory, when an abnormal end occurs.

10. The storage control method according to claim 9, further comprising:
- determining, when an abnormal end occurs, the beginning address of the to-be-saved data as the first start address to be first read from the cache memory at the saving the data from the beginning address,
- determining a first data save size to be read from the cache memory at the saving the data from the beginning address by multiplying the smallest value of an integer N by a predetermined boundary size, with a value obtained by multiplying a the boundary size by the integer N being larger than a half of the to-be-saved data,
- determining a second data save size to be read from the cache memory at the saving the data from the final address by multiplying the smallest value of an integer M by the boundary size, with a value obtained by multiplying the boundary size by the integer M being larger than a value obtained by subtracting the first data save size from the size of the to-be-saved data, and,
- determining a second start address to be first read from the cache memory at the saving the data from the final address, based on the final address and the second data save size,
- the saving the data from the beginning address includes storing, into the nonvolatile memory, data of a size equivalent to the first data save size calculated at the calculating, the data being from the first start address calculated at the calculating in the to-be-saved data, and
- the saving the data from the final address includes storing, into the nonvolatile memory, data of a size equivalent to the second data save size calculated at calculating, the data being from the second start address calculated by the calculating in the to-be-saved data.

11. The storage control method according to claim 8, wherein the determining includes determining whether a data error exists in the stripes, based on an error detection code or CRCs related to the stripes.

12. The storage control method according to claim 8, wherein the determining includes determining whether all the stripes exist, based on stripe identification numbers added to the stripes, the stripe identification numbers being for identifying the stripes.

13. A memory device comprising:
- a memory;
- a data reading unit configured to read data stripes and parity stripe from the memory, the data stripes being formed by dividing to-be-stored data by a predetermined stripe size, the parity stripe being formed by parity data for correcting a data error;
- a data correcting unit configured to, when a data error is detected in the stripes read by the data reading unit, correct the detected data error, based on the data stripes and parity stripe related to the error data stripe to which the detected data error belongs; and
- a data outputting unit configured to output data contained in the data stripes not including the data error, and output data contained in the corrected error data stripe including the corrected data.

14. The memory device according to claim 13, further comprising:

an additional data adding unit configured to, when the data reading unit does not finish reading one of the stripes within a predetermined period of time, add additional data which is a predetermined value to the one of the stripes until a size of the one of the stripes becomes equal to the stripe size, wherein the data correcting unit corrects the data error, based on the data stripes and parity stripe related to the error data stripe including the added additional data.

15. The memory device according to claim 13, wherein the data outputting unit outputs to a cache memory the data contained in the data stripes not including the data error, and outputs to the cache memory the data contained in the corrected error data stripe, and the memory is a nonvolatile memory.

16. A memory access control device for controlling an access for a memory, the access control device comprising:
a data reading unit configured to read data stripes and parity stripe from the memory, the data stripes being formed by dividing to-be-stored data by a predetermined stripe size, the parity stripe being formed by parity data for correcting a data error;
a data correcting unit configured to, when a data error is detected in the stripes read by the data reading unit, correct the detected data error, based on the data stripes and parity stripe related to the error data stripe to which the detected data error belongs; and
a data outputting unit configured to output data contained in the data stripes not including the data error, and output data contained in the corrected error data stripe including the corrected data.

17. The access control device according to claim 16, further comprising:
an additional data adding unit configured to, when the data reading unit does not finish reading one of the stripes within a predetermined period of time, add additional data which is a predetermined value to the one of the stripes until a size of the one of the stripes becomes equal to the stripe size, wherein the data correcting unit corrects the data error, based on the data stripes and parity stripe related to the error data stripe including the added additional data.

18. The memory access control device according to claim 16, wherein the data outputting unit outputs to a cache memory the data contained in the data stripes not including the data error, and outputs to the cache memory the data contained in the corrected error data stripe, and the memory is a nonvolatile memory.

19. A memory access control method for controlling an access for a memory, the storage control method comprising:
reading data stripes and parity stripe from the memory, the data stripes being formed by dividing to-be-stored data by a predetermined stripe size, the parity stripe being formed by parity data for correcting a data error;
correcting, when a data error is detected in the stripes read at the reading, the detected data error, based on the data stripes and parity stripe related to the error data stripe to which the detected data error belongs; and
outputting data contained in the data stripes not including the data error, and outputting data contained in the corrected error data stripe including the corrected data.

20. The memory access control method according to claim 19, further comprising:
adding, when one of the stripes is not read within a predetermined period of time at the data reading, additional data which is a predetermined value to the one of the stripes until a size of the one of the stripes becomes equal to the stripe size,
wherein the data correcting includes correcting the data error, based on the data stripes and parity stripe related to the error data stripe including the added additional data.

21. The memory access control method according to claim 19, wherein the outputting includes outputting to a cache memory the data contained in the data stripes not including the data error and, outputting to the cache memory the data contained in the corrected error data stripe, and the memory is a nonvolatile memory.

* * * * *

UNITED STATES PATENT AND TRADEMARK OFFICE
CERTIFICATE OF CORRECTION

PATENT NO. : 8,448,047 B2
APPLICATION NO. : 12/923005
DATED : May 21, 2013
INVENTOR(S) : Nina Tsukamoto et al.

Page 1 of 1

It is certified that error appears in the above-identified patent and that said Letters Patent is hereby corrected as shown below:

Title Page, Item (54) and in the Specification, Column 1, Line 2, in Title, Delete "INTERGRATED" and insert -- INTEGRATED --, therefor.

In the Claims:

Column 26, Line 17, In Claim 10, delete "a the" and insert -- the --, therefor.

Column 27, Line 32, In Claim 17, after "The" insert -- memory --.

Signed and Sealed this
Seventeenth Day of September, 2013

Teresa Stanek Rea
*Deputy Director of the United States Patent and Trademark Office*